US010156904B2

(12) United States Patent
Fleizach et al.

(10) Patent No.: US 10,156,904 B2
(45) Date of Patent: Dec. 18, 2018

(54) WRIST-BASED TACTILE TIME FEEDBACK FOR NON-SIGHTED USERS

(71) Applicant: Apple Inc., Cupertino, CA (US)

(72) Inventors: Christopher B. Fleizach, Morgan Hill, CA (US); Aaron Everitt, Cupertino, CA (US)

(73) Assignee: Apple Inc., Cupertino, CA (US)

(*) Notice: Subject to any disclaimer, the term of this patent is extended or adjusted under 35 U.S.C. 154(b) by 16 days.

(21) Appl. No.: 15/421,711

(22) Filed: Feb. 1, 2017

(65) Prior Publication Data
US 2017/0357321 A1 Dec. 14, 2017

Related U.S. Application Data

(60) Provisional application No. 62/349,061, filed on Jun. 12, 2016.

(51) Int. Cl.
G06F 3/01 (2006.01)
G04B 25/02 (2006.01)
G06F 3/041 (2006.01)

(52) U.S. Cl.
CPC ............ *G06F 3/016* (2013.01); *G04B 25/02* (2013.01); *G06F 3/0416* (2013.01)

(58) Field of Classification Search
None
See application file for complete search history.

(56) References Cited

U.S. PATENT DOCUMENTS

| 4,185,283 A | 1/1980 | Clark |
| 4,444,515 A * | 4/1984 | Clark ..................... G04G 21/08 368/156 |
| 4,859,100 A | 8/1989 | Carlson et al. |
| 5,119,079 A | 6/1992 | Hube et al. |
| 5,488,204 A | 1/1996 | Mead et al. |
| 5,528,260 A | 6/1996 | Kent |
| 5,832,528 A | 11/1998 | Kwatinetz et al. |
| 6,073,036 A | 6/2000 | Heikkinen et al. |
| 6,088,023 A | 7/2000 | Louis et al. |
| 6,128,007 A | 10/2000 | Seybold |
| 6,157,381 A | 12/2000 | Bates et al. |
| 6,192,258 B1 | 2/2001 | Kamada et al. |
| 6,339,438 B1 | 1/2002 | Bates et al. |
| 6,384,743 B1 | 5/2002 | Vanderheiden |

(Continued)

FOREIGN PATENT DOCUMENTS

| EP | 1168149 A2 | 1/2002 |
| EP | 1832969 A2 | 9/2007 |

(Continued)

OTHER PUBLICATIONS

Decision to Grant received for Danish Patent Application No. PA201770181, dated Mar. 7, 2018, 2 pages.

(Continued)

*Primary Examiner* — Christopher J Kohlman
(74) *Attorney, Agent, or Firm* — Dentons US LLP

(57) ABSTRACT

The present disclosure generally relates to tactile time feedback. Systems and methods for tactile time feedback include detecting a sequence of touch inputs at an electronic device, and in response to a determination that the sequence of touch inputs meets tactile time output criteria, output a tactile output pattern that indicates a time of day.

51 Claims, 19 Drawing Sheets

(56) References Cited

U.S. PATENT DOCUMENTS

| | | |
|---|---|---|
| 6,489,951 B1 | 12/2002 | Wong et al. |
| 6,556,222 B1 | 4/2003 | Narayanaswami |
| 6,624,803 B1 | 9/2003 | Vanderheiden et al. |
| 6,661,438 B1 | 12/2003 | Shiraishi et al. |
| 6,809,724 B1 | 10/2004 | Shiraishi et al. |
| 6,889,337 B1 | 5/2005 | Yee |
| 7,020,841 B2 | 3/2006 | Dantzig et al. |
| 7,098,896 B2 | 8/2006 | Kushler et al. |
| 7,227,963 B1 | 6/2007 | Yamada et al. |
| 7,250,938 B2 | 7/2007 | Kirkland et al. |
| 7,376,523 B2 | 5/2008 | Sullivan et al. |
| 7,408,538 B2 | 8/2008 | Hinckley et al. |
| 7,479,949 B2 | 1/2009 | Jobs et al. |
| 7,484,174 B2 | 1/2009 | Alderson |
| 7,489,303 B1 | 2/2009 | Pryor |
| 7,603,621 B2 | 10/2009 | Toyama et al. |
| 7,614,008 B2 | 11/2009 | Ording |
| 7,637,421 B1 | 12/2009 | Trocme |
| 7,886,229 B2 | 2/2011 | Pachet |
| 8,237,666 B2 | 8/2012 | Soo et al. |
| 8,411,590 B2 | 4/2013 | Wang |
| 8,448,095 B1 | 5/2013 | Haussila et al. |
| 8,452,600 B2 | 5/2013 | Fleizach |
| 8,466,873 B2 | 6/2013 | Vertegaal et al. |
| 8,468,469 B1 | 6/2013 | Mendis et al. |
| 8,493,344 B2 | 7/2013 | Fleizach et al. |
| 8,681,106 B2 | 3/2014 | Fleizach et al. |
| 8,751,971 B2 | 6/2014 | Fleizach |
| 9,009,612 B2 | 4/2015 | Fleizach et al. |
| 9,454,229 B1* | 9/2016 | Wellen .................. G06F 3/0416 |
| 9,646,471 B2 | 5/2017 | Agarwal |
| 2001/0035884 A1 | 11/2001 | Kikinis et al. |
| 2002/0046195 A1 | 4/2002 | Martin et al. |
| 2002/0120455 A1 | 8/2002 | Nakata |
| 2002/0126099 A1 | 9/2002 | Engholm |
| 2002/0156807 A1 | 10/2002 | Dieberger |
| 2002/0171689 A1 | 11/2002 | Fox et al. |
| 2003/0046082 A1 | 3/2003 | Siegel |
| 2003/0076301 A1 | 4/2003 | Tsuk et al. |
| 2003/0189598 A1 | 10/2003 | Lipstein et al. |
| 2004/0070612 A1 | 4/2004 | Sinclair et al. |
| 2004/0263491 A1 | 12/2004 | Ishigaki |
| 2005/0001821 A1 | 1/2005 | Low |
| 2005/0216867 A1 | 9/2005 | Marvit et al. |
| 2006/0026535 A1 | 2/2006 | Hotelling et al. |
| 2006/0028444 A1 | 2/2006 | Hinckley et al. |
| 2006/0119588 A1 | 6/2006 | Yoon et al. |
| 2006/0150084 A1 | 7/2006 | Dietl et al. |
| 2006/0150110 A1 | 7/2006 | Dietl et al. |
| 2006/0268019 A1 | 11/2006 | Wang et al. |
| 2006/0268020 A1 | 11/2006 | Han |
| 2007/0070090 A1 | 3/2007 | Debettencourt et al. |
| 2007/0085841 A1 | 4/2007 | Tsuk et al. |
| 2007/0209017 A1 | 9/2007 | Gupta et al. |
| 2007/0220444 A1 | 9/2007 | Sunday et al. |
| 2007/0236475 A1 | 10/2007 | Wherry |
| 2007/0247435 A1 | 10/2007 | Benko et al. |
| 2007/0268270 A1 | 11/2007 | Onodera et al. |
| 2007/0296711 A1 | 12/2007 | Yee et al. |
| 2008/0033256 A1 | 2/2008 | Farhan et al. |
| 2008/0062141 A1 | 3/2008 | Chaudhri |
| 2008/0122796 A1 | 5/2008 | Jobs et al. |
| 2008/0126937 A1 | 5/2008 | Pachet |
| 2008/0130421 A1 | 6/2008 | Akaiwa et al. |
| 2008/0148177 A1 | 6/2008 | Lang et al. |
| 2008/0155461 A1 | 6/2008 | Ozaki |
| 2008/0165140 A1 | 7/2008 | Christie et al. |
| 2008/0165141 A1 | 7/2008 | Christie |
| 2008/0168349 A1 | 7/2008 | Lamiraux et al. |
| 2008/0168404 A1 | 7/2008 | Ording |
| 2008/0259040 A1 | 10/2008 | Ording et al. |
| 2009/0007026 A1 | 1/2009 | Scott |
| 2009/0015550 A1 | 1/2009 | Koski |
| 2009/0199130 A1 | 8/2009 | Tsern et al. |
| 2009/0235203 A1 | 9/2009 | Iizuka |
| 2009/0303187 A1 | 12/2009 | Pallakoff |
| 2010/0001953 A1 | 1/2010 | Yamamoto et al. |
| 2010/0039382 A1 | 2/2010 | Kumagai et al. |
| 2010/0058240 A1 | 3/2010 | Bull et al. |
| 2010/0073303 A1 | 3/2010 | Wu et al. |
| 2010/0169097 A1 | 7/2010 | Nachman et al. |
| 2010/0169819 A1 | 7/2010 | Bestle et al. |
| 2010/0222098 A1 | 9/2010 | Garg |
| 2010/0269038 A1 | 10/2010 | Tsuda |
| 2010/0283742 A1 | 11/2010 | Lam |
| 2010/0289757 A1 | 11/2010 | Budelli |
| 2010/0295793 A1 | 11/2010 | Srinivasan et al. |
| 2010/0309147 A1 | 12/2010 | Fleizach et al. |
| 2010/0309148 A1 | 12/2010 | Fleizach et al. |
| 2010/0313125 A1 | 12/2010 | Fleizach et al. |
| 2010/0325575 A1 | 12/2010 | Platzer et al. |
| 2011/0081889 A1* | 4/2011 | Gao ........................ G06F 3/038 |
| | | 455/411 |
| 2011/0083104 A1 | 4/2011 | Minton |
| 2011/0099509 A1 | 4/2011 | Horagai |
| 2011/0157046 A1 | 6/2011 | Lee et al. |
| 2011/0164042 A1 | 7/2011 | Chaudhri |
| 2011/0210834 A1* | 9/2011 | Pasquero ................. G06F 3/016 |
| | | 340/407.1 |
| 2011/0210926 A1 | 9/2011 | Pasquero et al. |
| 2011/0298723 A1 | 12/2011 | Fleizach et al. |
| 2011/0300915 A1* | 12/2011 | Stoustrup .............. G06F 1/3203 |
| | | 455/574 |
| 2011/0302519 A1 | 12/2011 | Fleizach et al. |
| 2012/0011437 A1 | 1/2012 | James et al. |
| 2012/0066638 A1 | 3/2012 | Ohri |
| 2012/0092383 A1 | 4/2012 | Hysek et al. |
| 2012/0131504 A1 | 5/2012 | Fadell et al. |
| 2012/0174005 A1 | 7/2012 | Deutsch et al. |
| 2012/0218205 A1* | 8/2012 | Park .................... G06F 3/04842 |
| | | 345/173 |
| 2012/0242584 A1* | 9/2012 | Tuli ...................... G06F 3/016 |
| | | 345/173 |
| 2012/0286944 A1 | 11/2012 | Forutanpour et al. |
| 2012/0307603 A1 | 12/2012 | Bongio et al. |
| 2013/0063389 A1 | 3/2013 | Moore |
| 2013/0145292 A1 | 6/2013 | Cohen et al. |
| 2013/0149674 A1 | 6/2013 | Anderson et al. |
| 2013/0191910 A1 | 7/2013 | Dellinger et al. |
| 2013/0191911 A1 | 7/2013 | Dellinger et al. |
| 2013/0307603 A1* | 11/2013 | Koester .................... H03K 5/15 |
| | | 327/258 |
| 2013/0311921 A1 | 11/2013 | Fleizach et al. |
| 2013/0332827 A1 | 12/2013 | Smith |
| 2014/0058733 A1 | 2/2014 | Voorhees et al. |
| 2014/0143678 A1 | 5/2014 | Mistry et al. |
| 2014/0143737 A1 | 5/2014 | Mistry et al. |
| 2014/0192626 A1 | 7/2014 | Wolff et al. |
| 2014/0258935 A1 | 9/2014 | Nishida et al. |
| 2014/0282214 A1 | 9/2014 | Shirzadi et al. |
| 2014/0325407 A1 | 10/2014 | Morris et al. |
| 2015/0011204 A1* | 1/2015 | Seo .......................... H04W 8/183 |
| | | 455/419 |
| 2015/0041289 A1 | 2/2015 | Ely |
| 2015/0045000 A1 | 2/2015 | Kim et al. |
| 2015/0293592 A1* | 10/2015 | Cheong ................... G06F 3/016 |
| | | 345/173 |
| 2015/0339018 A1* | 11/2015 | Moon ................... G06F 3/0484 |
| | | 715/765 |
| 2015/0370529 A1 | 12/2015 | Zambetti et al. |
| 2015/0378447 A1 | 12/2015 | Nagano et al. |
| 2016/0070433 A1 | 3/2016 | Fleizach et al. |
| 2016/0170624 A1 | 6/2016 | Zambetti et al. |
| 2016/0170625 A1 | 6/2016 | Zambetti et al. |
| 2016/0259535 A1 | 9/2016 | Fleizach et al. |
| 2016/0327911 A1 | 11/2016 | Eim et al. |
| 2016/0357281 A1 | 12/2016 | Fleizach et al. |
| 2017/0315716 A1 | 11/2017 | Zambetti et al. |

(56) References Cited

U.S. PATENT DOCUMENTS

| | | | |
|---|---|---|---|
| 2018/0074690 | A1 | 3/2018 | Zambetti et al. |
| 2018/0210516 | A1 | 7/2018 | Zambetti et al. |

FOREIGN PATENT DOCUMENTS

| | | | |
|---|---|---|---|
| EP | 2207084 | A2 | 7/2010 |
| EP | 2302492 | A2 | 3/2011 |
| EP | 2385451 | A1 | 11/2011 |
| JP | 63-271516 | A | 11/1988 |
| JP | 1-283621 | A | 11/1989 |
| JP | 2-244214 | A | 9/1990 |
| JP | 8-83156 | A | 3/1996 |
| JP | 2001-147775 | A | 5/2001 |
| JP | 2001-202178 | A | 7/2001 |
| JP | 2003-256911 | A | 9/2003 |
| JP | 2003-316254 | A | 11/2003 |
| JP | 2003-330856 | A | 11/2003 |
| JP | 2004-259063 | A | 9/2004 |
| JP | 2005-10894 | A | 1/2005 |
| JP | 2006-011690 | A | 1/2006 |
| JP | 2006-501567 | A | 1/2006 |
| JP | 2006-134090 | A | 5/2006 |
| JP | 2007-156983 | A | 6/2007 |
| JP | 2008-508600 | A | 3/2008 |
| JP | 2008-157974 | A | 7/2008 |
| JP | 2008-539513 | A | 11/2008 |
| JP | 2009-510404 | A | 3/2009 |
| JP | 2009-93291 | A | 4/2009 |
| JP | 2009-294526 | A | 12/2009 |
| JP | 2011-530738 | A | 12/2011 |
| JP | 2013-122738 | A | 6/2013 |
| JP | 2014-42164 | A | 3/2014 |
| KR | 10-2005-0051638 | A | 6/2005 |
| KR | 10-2009-0040462 | A | 4/2009 |
| KR | 10-2009-0056469 | A | 6/2009 |
| KR | 10-2011-0114294 | A | 10/2011 |
| TW | I244040 | B | 11/2005 |
| TW | I305518 | B | 1/2009 |
| TW | 2013-49078 | A | 12/2013 |
| WO | 1992/08183 | A1 | 5/1992 |
| WO | 2001/69369 | A1 | 9/2001 |
| WO | 2004/031937 | A1 | 4/2004 |
| WO | 2006/020305 | A2 | 2/2006 |
| WO | 2008/149991 | A1 | 12/2008 |
| WO | 2009/026508 | A1 | 2/2009 |
| WO | 2010/024969 | A1 | 3/2010 |
| WO | 2012/080020 | A1 | 6/2012 |
| WO | 2014/040675 | A2 | 3/2014 |

OTHER PUBLICATIONS

Notice of Allowance received for U.S. Appl. No. 14/841,656, dated Mar. 5, 2018, 3 pages.
"Nova Launcher", Available on https://web.archive.org/web/20150703231459/https://play.google.com/store/apps/details?id=com.teslacoilsw.launcher, Jul. 3, 2015, 3 pages.
Office Action received for Australian Patent Application No. 2018200998, dated Mar. 9, 2018, 5 pages.
Office Action received for Danish Patent Application No. PA201670580, dated Mar. 8, 2018, 3 pages.
Office Action received for Korean Patent Application No. 10-2018-7002695, dated Feb. 27, 2018, 12 pages (5 pages of English Translation and 7 pages of Official copy).
The Blind Life, "Double Tap Big Clock", available on: https://www.youttlbe.com/watch?v-=U6XMnSPCEXU, Published on Mar. 2, 2016, 2 pages.
Office Action received for European Patent Application No. 14771688.0, dated Nov. 30, 2017, 15 pages.
Office Action received for Korean Patent Application No. 10-2016-7008682, dated Nov. 27, 2017, 7 pages (3 page of English Translation and 4 pages of Official Copy).
Brinkmann, Martin, "How to Zoom in Firefox", Ghacks, Available at <https://web.archive.org/web/20130804034728/https://www.ghacks.net/2009/02/23/how-to-zoom-in-firefox/>, Aug. 4, 2013, 11 pages.
Office Action received for Danish Patent Application No. PA201770181, dated Jan. 3, 2018, 2 pages.
Office Action received for Korean Patent Application No. 10-2012-7003523, dated Dec. 26, 2017, 6 pages (3 pages of English Translation and 3 pages of Official copy).
Advisory Action received for U.S. Appl. No. 15/049,058, dated Oct. 18, 2017, 3 pages.
International Preliminary Report on Patentability received for PCT Patent Application No. PCT/US2016/019637, dated Sep. 21, 2017, 12 pages.
International Search Report and Written Opinion Received for PCT Patent Application No. PCT/US2017/035325, dated Sep. 7, 2017, 11 pages.
Non-Final Office Action received for U.S. Appl. No. 14/943,005, dated Oct. 18, 2017, 12 pages.
Non-Final Office Action received for U.S. Appl. No. 15/049,058, dated Feb. 20, 2018, 21 pages.
Notice of Allowance Action received for U.S. Appl. No. 14/841,656, dated Feb. 12, 2018, 9 pages.
Office Action received for Korean Patent Application No. 10-2016-7008682, dated Feb. 8, 2018, 7 pages (3 pages of English Translation and 4 pages of Official Copy).
"iPhone User Guide for iOS 7.1 Software", Available online at <https://manuals.info.apple.com/MANUALS/1000/MA1681/en_US/iphone_ios7_user_guide.pdf> Mar. 2014, pp. 1-162.
Advisory Action received for U.S. Appl. No. 15/049,064, dated May 10, 2017, 3 pages.
Final Office Action received for U.S. Appl. No. 15/049,058, dated May 8, 2017, 21 pages.
Final Office Action received for U.S. Appl. No. 15/049,064, dated Feb. 27, 2017, 13 pages.
Gurman, Mark, "Apple Watch iPhone 'Companion' app Revealed w/ New Watch features, Monograms", Jan. 13, 2015, pp. 1-18.
International Preliminary Report on Patentability received for PCT Patent Application No. PCT/US2014/053961, dated Jul. 21, 2016, 24 pages.
International Preliminary Report on Patentability received for PCT Patent Application No. PCT/US2015/054974, dated Sep. 14, 2017, 14 pages.
International Search Report and Written Opinion received for PCT Patent Application No. PCT/US2015/054974, dated Apr. 20, 2016, 20 pages.
International Search Report and Written Opinion received for PCT Patent Application No. PCT/US2016/019637, dated Aug. 18, 2016, 18 pages.
International Search Report received for PCT Patent Application No. PCT/US2014/053961, dated Jul. 11, 2016, 10 pages.
Invitation to Pay Additional Fees received for PCT Application No. PCT/US2014/053961, dated Aug. 3, 2015, 6 pages.
Invitation to pay additional fees received for PCT Patent Application No. PCT/US2015/054974, dated Feb. 12, 2016, 7 pages.
Invitation to Pay Additional Fees received for PCT Patent Application No. PCT/US2016/019637, dated Jun. 1, 2016, 6 pages.
Non-Final Office Action received for U.S. Appl. No. 14/841,656, dated Jul. 26, 2017, 20 pages.
Non-Final Office Action received for U.S. Appl. No. 14/863,195, dated May 4, 2017, 9 pages.
Non-Final Office Action received for U.S. dated No. 15/049,058, dated Nov. 16, 2016, 19 pages.
Non-Final Office Action received for U.S. Appl. No. 15/049,064, dated Oct. 27, 2016, 15 pages.
Notice of Allowance received for Danish Patent Application No. PA201670118, dated Mar. 30, 2017, 2 pages.
Notice of Allowance received for Taiwanese Patent Application No. 103130519, dated Oct. 27, 2016, 3 pages (Official Copy only). {See Communication under 37 CFR § 1.98(a) (3)}.
Notice of Allowance received for Taiwanese Patent Application No. 104135930, dated Nov. 9, 2016, 4 pages (1 page of English Translation of Search Report and 3 pages of Official Copy). {See Communication under 37 CFR § 1.98(a) (3)}.

(56) References Cited

OTHER PUBLICATIONS

Notice of Allowance received for U.S. Appl. No. 15/049,064, dated Jul. 18, 2017, 24 pages.
Notice of Allowance received for U.S. Appl. No. 15/058,996, dated Dec. 27, 2016, 10 pages.
Office Action received for Danish Patent Application No. PA 201670118, dated Jul. 1, 2016, 7 pages.
Office Action received for Australian Patent Application No. 2014315234, dated Jul. 12, 2017, 4 pages.
Office Action received for Australian Patent Application No. 2014315234, dated Nov. 2, 2016, 3 pages.
Office Action received for Australian Patent Application No. 2014315234, dated Apr. 19, 2017, 4 pages.
Office Action received for Danish Patent Application No. PA201670118, dated Feb. 2, 2017, 2 pages.
Office Action received for Danish Patent Application No. PA201670118, dated Oct. 25, 2016, 3 pages.
Office Action received for Danish Patent Application No. PA201670580, dated Jan. 31, 2017, 7 pages.
Office Action received for Danish Patent Application No. PA201770181, dated Jun. 13, 2017, 6 pages.
Office Action received for Japanese Patent Application No. 2016-537948, dated Jun. 9, 2017, 10 pages (5 pages of English Translation and 5 pages of Official Copy).
Office Action received for Korean Patent Application No. 10-2016-7008682, dated Dec. 30, 2016, 11 pages (4 pages of English Translation 7 pages of Official Copy).
Office Action received for Taiwanese Patent Application No. 103130519.0, dated Mar. 25, 2016, 14 pages (6 pages of English Translation and 8 pages of Official Copy).
Written Opinion received for PCT Patent Application No. PCT/US2014/053961, dated Jul. 11, 2016, 22 pages.
Decision to Grant received for the Japanese Patent Application No. 2012513959, dated Aug. 17, 2015, 6 pages (3 pages of English Translation and 3 pages of Official Copy).
Extended European Search Report received for European Patent Application No. 12154609.7, dated Oct. 5, 2012, 8 pages.
Extended European Search Report received for European Patent Application No. 12154613.9, dated Jul. 6, 2012, 6 pages.
Final Office Action received for U.S. Appl. No. 12/565,744, dated Dec. 6, 2012, 14 pages.
International Preliminary Report on Patentability received for PCT Patent Application No. PCT/US2010/034109, dated Dec. 22, 2011, 11 pages.
International Preliminary Report on Patentability received for PCT Patent Application No. PCT/US2012/040703, dated Dec. 27, 2013, 9 pages.
International Search Report and Written Opinion received for PCT Patent Application No. PCT/US2010/047433, dated Nov. 29, 2010, 8 pages.
International Search Report and Written Opinion received for PCT Patent Application No. PCT/US2010/034109, dated Jun. 22, 2011, 15 pages.
International Search Report and Written Opinion received for PCT Patent Application No. PCT/US2012/040703 dated Aug. 30, 2012, 10 pages.
Non-Final Office Action received for U.S. Appl. No. 12/565,744, dated Dec. 3, 2013, 14 pages.
Non-Final Office Action received for U.S. Appl. No. 12/565,744, dated May 25, 2012, 15 pages.
Non-Final Office Action received for U.S. Appl. No. 12/565,745, dated Jul. 12, 2012, 7 pages.
Non-Final Office Action received for U.S. Appl. No. 12/565,746, dated Jul. 19, 2013, 14 pages.
Non-Final Office Action received for U.S. Appl. No. 12/795,633, dated Apr. 25, 2013, 9 pages.
Non-Final Office Action received for U.S. Appl. No. 12/795,633, dated Aug. 30, 2012, 9 pages.
Non-Final Office Action received for U.S. Appl. No. 12/795,633, dated Dec. 21, 2011, 9 pages.
Non-Final Office Action received for U.S. Appl. No. 12/795,635, dated Jul. 25, 2013, 45 pages.
Non-Final Office Action received for U.S. Appl. No. 12/795,635, dated Mar. 7, 2013, 41 pages.
Non-Final Office Action received for U.S. Appl. No. 13/221,833, dated Sep. 13, 2013, 5 pages.
Non-Final Office Action received for U.S. Appl. No. 13/949,149, dated Jul. 16, 2015, 11 pages.
Notice of Acceptance received for Australian Patent Application No. 2010259191, dated Mar. 21, 2014, 2 pages.
Notice of Allowance received for Korean Patent Application No. 10-2012-7000663, dated Jul. 24, 2014, 2 pages (Official Copy only) (See Communication under 37 CFR § 1.98(a) (3)).
Notice of Allowance received for Korean Patent Application No. 10-2012-7001628, dated Jan. 29, 2015, 2 pages (Official Copy Only) (See Communication under 37 CFR § 1.98(a) (3)).
Notice of Allowance received for Korean Patent Application No. 10-2012-7001631, dated Oct. 27, 2015, 3 pages (1 pages of English translation and 2 pages of Official copy).
Notice of Allowance received for Korean Patent Application No. 10-2016-7002541, dated Mar. 29, 2017, 3 pages (1 page of English Translation and 2 pages of Official Copy).
Notice of Allowance received for U.S. Appl. No. 12/565,744, dated Dec. 12, 2014, 5 pages.
Notice of Allowance received for U.S. Appl. No. 12/565,744, dated Jul. 18, 2014, 11 pages.
Notice of Allowance received for U.S. Appl. No. 12/565,745, dated Mar. 15, 2013, 5 pages.
Notice of Allowance received for U.S. Appl. No. 12/565,745, dated Nov. 26, 2012, 5 pages.
Notice of Allowance received for U.S. Appl. No. 12/565,746, dated Jan. 2, 2014, 8 pages.
Notice of Allowance received for U.S. Appl. No. 12/795,633, dated Nov. 20, 2013, 12 pages.
Notice of Allowance received for U.S. Appl. No. 13/221,833, dated Jan. 29, 2014, 6 pages.
Office Action received for European Patent Application No. 10719502.6, dated Nov. 20, 2012, 5 pages.
Office Action received for European Patent Application No. 10719502.6, dated Oct. 28, 2015, 5 pages.
Office Action received for European Patent Application No. 12154609.7, dated Jul. 3, 2017, 9 pages.
Office Action received for European Patent Application No. 12154609.7, dated May 15, 2014, 6 pages.
Office Action received for European Patent Application No. 12154613.9, dated Jul. 5, 2016, 6 pages.
Office Action received for European Patent Application No. 12154613.9, dated May 7, 2013, 6 pages.
Office Action received for Japanese Patent Application No. 2012-024484, dated Dec. 12, 2014, 2 pages (Official Copy only) (See Communication under 37 CFR § 1.98(a) (3)).
Office Action received for Japanese Patent Application No. 2012-024484, dated Feb. 13, 2015, 3 pages (Official Copy Only) (See Communication under 37 CFR § 1.98(a) (3)).
Office Action received for Japanese Patent Application No. 2012-024484, dated Mar. 31, 2014, 6 pages (4 pages of English Translation and 2 pages of Official copy).
Office Action received for Japanese Patent Application No. 2012-513959, dated Apr. 28, 2014, 6 pages (4 pages of English Translation and 2 pages of Office Copy).
Office Action received for Japanese Patent Application No. 2012-513959, dated Feb. 2, 2015, 6 pages (3 pages of English Translation and 3 pages of Official Copy).
Office Action received for Korean Patent Application No. 10-2012-7001628, dated Jun. 11, 2014, 4 pages (1 page of English Translation and 3 pages of Official copy).
Office Action received for Korean Patent Application No. 10-2012-7001631, dated Apr. 9, 2015, 9 pages (4 pages of English Translation and 5 pages of Official Copy).
Office Action received for Korean Patent Application No. 10-2012-7001631, dated Jan. 29, 2015, 5 pages (2 pages of English Translation and 3 pages of Official copy).

(56) References Cited

OTHER PUBLICATIONS

Office Action received for Korean Patent Application No. 10-2012-7001631, dated Jun. 11, 2014, 4 pages (1 page of English Translation and 3 pages of Official copy).
Office Action received for Korean Patent Application No. 10-2012-7003523, dated Feb. 27, 2017, 8 pages (4 pages of English Translation and 4 pages of Official copy).
Office Action received for Korean Patent Application No. 10-2012-7003523, dated Mar. 31, 2016, 5 pages (2 pages of English Translation and 3 pages of official copy).
Office Action received for Korean Patent Application No. 10-2016-7002541, dated May 2, 2016, 9 pages (4 pages of English Translation and 5 pages of Official Copy).
"Telling Time by Vibration", 6th International Conference, EuroHaptics 2008 Madrid, Spain, Jun. 10-13, 2008, pp. 924-929.
Toyssy, et al., "Telling Time by Vibration", University of Tampere, University of Tampere, Department of Computer Sciences, interactive Technology, Master's Thesis, Nov. 2007, p. 25, 2nd last para, p. 26, 1st para and p. 32, 2nd para.
"This Watch Tells You the Time in Vibrating Morse Code", Available at <https://web.archive.org/web/20130915060538/http://www.tomsguide.com/us/Watch-Concept-Morse-Code,news-12089.html>, Aug. 9, 2011, 3 Pages.
"Timebuzz app for iwatch", Available at <https://web.archive.org/web/20160125032143/http://www.timebuzz.nl/, 10 pages.
Corrected Notice of Allowance received for U.S. Appl. No. 14/841,656, dated Apr. 11, 2018, 2 pages.
Notice of Allowance received for U.S. Appl. No. 14/943,005, dated Apr. 12, 2018, 8 pages.
Office Action received for Australian Patent Application No. 2016229407, dated Aug. 15, 2018, 4 pages.
Office Action received for Australian Patent Application No. 2017254897, dated Aug. 29, 2018, 4 pages.
Office Action received for Japanese Patent Application No. 2017-545561, dated Aug. 6, 2018, 8 pages (4 pages of English Translation and 4 pages of Official Copy).
Non-Final Office Action received for U.S. Appl. No. 14/839,894, dated Jun. 6, 2018, 19 pages.
Office Action received for European Patent Application No. 14771688.0, dated May 31, 2018, 6 pages.
Final Office Action received for U.S. Appl. No. 15/049,058, dated Aug. 8, 2018, 23 pages.
Corrected Notice of Allowance received for U.S. Appl. No. 14/841,656, dated May 7, 2018, 14 pages.
Office Action received for European Patent Application No. 18157131.6, dated May 8, 2018, 12 pages.
Office Action received for Korean Patent Application No. 10-2012-7003523, dated Apr. 23, 2018, 7 pages (3 pages of English Translation and 4 pages of Official Copy).
Office Action received for Japanese Patent Application No. 2016-537948, dated Apr. 6, 2018, 5 pages (2 pages of English Translation and 3 pages of Official Copy).
Search Report received for European Patent Application No. 18157131.6, dated Apr. 19, 2018, 4 pages.
Office Action received for Korean Patent Application No. 10-2018-7002695, dated Jun. 19, 2018, 8 pages (4 pages of English Translation and 4 pages of Official Copy).

\* cited by examiner

WRIST-BASED TACTILE TIME FEEDBACK FOR NON-SIGHTED USERS

CROSS-REFERENCE TO RELATED APPLICATIONS

This application claims priority to U.S. provisional patent application 62/349,061, entitled "WRIST-BASED TACTILE TIME FEEDBACK FOR NON-SIGHTED USERS", filed Jun. 12, 2016, the content of which is hereby incorporated by reference in its entirety.

FIELD

The present disclosure relates generally to computer user interfaces, and more specifically to techniques for outputting time.

BACKGROUND

Typically, electronic devices such as mobile phones and wearable electronics output time by displaying the time on a display screen. However, the time is typically viewed by looking at a displayed time.

BRIEF SUMMARY

In some situations, viewing the time on a display screen may be inconvenient or impossible for a user. For example, in certain settings the user may wish to ascertain the time in a more discreet manner without having to divert their attention to the display screen. In other examples, the user may have difficulty seeing contents on the display screen if they have forgotten their glasses, have low-vision or lack vision. While some electronic devices may offer audio output of the time, such methods provide little to no privacy and may be challenging to use in loud environments. Therefore, there is a need for an improved way for electronic devices to communicate the time. This disclosure is intended to address such issues and to provide related advantages. Some techniques for outputting time using electronic devices, however, are cumbersome and inefficient. For example, some techniques include outputting the time by displaying the time on a user interface of a display screen of the electronic device. However, there may be situations where the user wishes to ascertain the time without having to divert their attention away to the display screen. In such cases, a more discreet method of ascertaining the time may be preferred. Still, other users wishing to ascertain the time may have uncorrected vision, for example if they have momentarily misplaced their spectacles or otherwise lack vision correction aids. Still further, some users with low-vision or lack of vision may be unable to view the time displayed on the display screen. While audio output of time may be available, in some cases such output may be unfavorable to the user due to its lack of discretion, a loud background noise, and/or if the user is low-hearing. In many ways, existing techniques may present cumbersome, inefficient and/or awkward situations for the user. Additionally, many devices are multifunction devices that may provide outputs other than the time. For such devices, user request for a time output may be misinterpreted as a request for a non-time output and vice versa.

Accordingly, the present disclosure provides electronic devices, interfaces, and methods for faster, more efficient ways for outputting time, such as by providing tactile time feedback. Additionally, the present disclosure provides electronic devices and methods for determining when the user is requesting a time output—and when the user is not requesting a time output. Optionally, some methods described herein complement or replace other methods for outputting time. At the same time, the methods and interfaces presented herein reduce cognitive burden on a user and produce a more efficient human-machine interface. For example, the electronic devices, interfaces, and methods described herein reduce the need to navigate through several interfaces in order to receive a desired time output. At the same time, in practice, the systems and methods described herein lend to reduced battery usage by the display screen, thereby conserving battery power.

In accordance with some embodiments, a method is performed at an electronic device having a touch-sensitive surface and a tactile output generator. The method includes detecting a sequence of touch inputs on the touch-sensitive surface The method includes, in response to detecting the sequence of touch inputs on the touch-sensitive surface, and in accordance with a determination that the sequence of touch inputs detected on the touch-sensitive surface meets a tactile time output criteria and a current time of day is a first time, where the tactile time output criteria includes a criterion that is met when a predetermined number of taps are detected on the touch-sensitive surface within a predetermined time threshold, outputting, by the tactile output generator, a first tactile output pattern that is indicative of the first time. Further, the method includes, in response to detecting the sequence of touch inputs on the touch-sensitive surface, and in accordance with a determination that the sequence of touch inputs detected on the touch-sensitive surface meets the tactile time output criteria and the current time of day is a second time, outputting, by the tactile output generator, a second tactile output pattern that is indicative of the second time. The first tactile output pattern and the second tactile output pattern may be different. Still further, the method includes, in response to detecting the sequence of touch inputs on the touch-sensitive surface, and in accordance with a determination that the sequence of touch inputs detected on the touch-sensitive surface does not meet the tactile time output criteria, forgo outputting a tactile output pattern that is indicative of the current time of day.

In accordance with some embodiments, a method is performed at an electronic device with a tactile output generator, a touch-sensitive surface, one or more processors, a memory, and one or more programs. The one or more programs are stored in the memory and configured to be executed by the one or more processors. The one or more programs include instructions for detecting a sequence of touch inputs on the touch-sensitive surface. The one or more programs include instructions for, in response to detecting the sequence of touch inputs on the touch-sensitive surface, in accordance with a determination that the sequence of touch inputs detected on the touch-sensitive surface meets a tactile time output criteria and a current time of day is a first time, where the tactile time output criteria includes a criterion that is met when a predetermined number of taps are detected on the touch-sensitive surface within a predetermined time threshold, outputting, by the tactile output generator, a first tactile output pattern that is indicative of the first time. The one or more programs include instructions for, in response to detecting the sequence of touch inputs on the touch-sensitive surface, in accordance with a determination that the sequence of touch inputs detected on the touch-sensitive surface meets the tactile time output criteria and the current time of day is a second time, outputting, by the tactile output generator, a second tactile output pattern that is indicative of the second time, wherein the first tactile output pattern and the second tactile output pattern are different. Further, the one or more programs include instructions for, in response to detecting the sequence of touch inputs on the touch-sensitive surface, in accordance with a determination that the sequence of touch inputs detected on the touch-sensitive surface does not meet the tactile time output criteria, forgo outputting a tactile output pattern that is indicative of the current time of day.

In accordance with some embodiments, a non-transitory computer readable storage medium stores one or more programs, where the one or more programs include instructions which, when executed by one or more processors of an electronic device with a touch-sensitive surface and a tactile output generator, cause the device to perform one or more steps. The one or more programs include instructions that, when executed, cause the device to detect a sequence of touch inputs on the touch-sensitive surface. The one or more programs include instructions that, when executed, cause the device to, in response to detecting the sequence of touch inputs on the touch-sensitive surface, and in accordance with a determination that the sequence of touch inputs detected on the touch-sensitive surface meets a tactile time output criteria and a current time of day is a first time, where the tactile time output criteria includes a criterion that is met when a predetermined number of taps are detected on the touch-sensitive surface within a predetermined time threshold, output, by the tactile output generator, a first tactile output pattern that is indicative of the first time. The one or more programs include instructions that, when executed, cause the device to, in response to detecting the sequence of touch inputs on the touch-sensitive surface, and in accordance with a determination that the sequence of touch inputs detected on the touch-sensitive surface meets the tactile time output criteria and the current time of day is a second time, output, by the tactile output generator, a second tactile output pattern that is indicative of the second time, where the first tactile output pattern and the second tactile output pattern are different. Further, the one or more programs include instructions that, when executed, cause the device to, in response to detecting the sequence of touch inputs on the touch-sensitive surface, and in accordance with a determination that the sequence of touch inputs detected on the touch-sensitive surface does not meet the tactile time output criteria, forgo output of a tactile output pattern that is indicative of the current time of day.

In accordance with some embodiments, an electronic device includes a tactile output generator, a touch-sensitive surface, and means for detecting a sequence of touch inputs on the touch-sensitive surface. The electronic device includes means for, in response to detecting the sequence of touch inputs on the touch-sensitive surface, and in accordance with a determination that the sequence of touch inputs detected on the touch-sensitive surface meets a tactile time output criteria and a current time of day is a first time, wherein the tactile time output criteria includes a criterion that is met when a predetermined number of taps are detected on the touch-sensitive surface within a predetermined time threshold, outputting, by the tactile output generator, a first tactile output pattern that is indicative of the first time. The electronic device includes means for, in response to detecting the sequence of touch inputs on the touch-sensitive surface, and in accordance with a determination that the sequence of touch inputs detected on the touch-sensitive surface meets the tactile time output criteria and the current time of day is a second time, outputting, by the tactile output generator, a second tactile output pattern that is indicative of the second time, wherein the first tactile output pattern and the second tactile output pattern are different. Further, the electronic device includes means for, in response to detecting the sequence of touch inputs on the touch-sensitive surface, in accordance with a determination that the sequence of touch inputs detected on the touch-sensitive surface does not meet the tactile time output criteria, forgo outputting a tactile output pattern that is indicative of the current time of day.

In some embodiments, an electronic device includes a tactile output generator unit configured to generate a tactile output pattern, a touch-sensitive surface unit configured to receive contacts, and a processing unit coupled to the tactile output generator unit and the touch-sensitive surface unit. The processing unit is configured to detect a sequence of touch inputs on the touch-sensitive surface unit. The processing unit is configured to, in response to detecting the sequence of touch inputs on the touch-sensitive surface unit, and in accordance with a determination that the sequence of touch inputs detected on the touch-sensitive surface meets a tactile time output criteria and a current time of day is a first time, wherein the tactile time output criteria includes a criterion that is met when a predetermined number of taps are detected on the touch-sensitive surface within a predetermined time threshold, output, by the tactile output generator unit, a first tactile output pattern that is indicative of the first time. The processing unit is configured to, in response to detecting the sequence of touch inputs on the touch-sensitive surface unit, and in accordance with a determination that the sequence of touch inputs detected on the touch-sensitive surface meets the tactile time output criteria and the current time of day is a second time, outputting, by the tactile output generator unit, a second tactile output pattern that is indicative of the second time, wherein the first tactile output pattern and the second tactile output pattern are different. Further, The processing unit is configured to, in response to detecting the sequence of touch inputs on the touch-sensitive surface unit, and in accordance with a determination that the sequence of touch inputs detected on the touch-sensitive surface does not meet the tactile time output criteria, forgo outputting a tactile output pattern that is indicative of the current time of day.

In accordance with some embodiments, an electronic device may include optionally a display, tactile output generator, a touch-sensitive surface, one or more processors, a memory, and one or more programs, where the one or more programs are stored in the memory and configured to be executed by the one or more processors and the one or more programs include instructions for performing the operations of any of the methods described above. In accordance with some embodiments, an electronic device includes a tactile output generator and a touch-sensitive surface, and means for performing any of the methods described above. In accordance with some embodiments, a non-transitory computer-readable storage medium stores one or more programs, where the one or more programs include instructions, which when executed by one or more processors of an electronic device with a touch-sensitive surface and a tactile output generator, cause the device to perform any of the methods described above.

In accordance with some embodiments, a transitory computer readable storage medium stores one or more programs, where the one or more programs include instructions which, when executed by one or more processors of an electronic device with a touch-sensitive surface and a tactile output generator, cause the device to perform one or more steps. The one or more programs include instructions that, when executed, cause the device to detect a sequence of touch inputs on the touch-sensitive surface. The one or more programs include instructions that, when executed, cause the device to, in response to detecting the sequence of touch inputs on the touch-sensitive surface, and in accordance with a determination that the sequence of touch inputs detected on the touch-sensitive surface meets a tactile time output criteria and a current time of day is a first time, where the tactile time output criteria includes a criterion that is met when a predetermined number of taps are detected on the touch-sensitive surface within a predetermined time threshold, output, by the tactile output generator, a first tactile output pattern that is indicative of the first time. The one or more programs include instructions that, when executed, cause the device to, in response to detecting the sequence of touch inputs on the touch-sensitive surface, and in accordance with a determination that the sequence of touch inputs detected on the touch-sensitive surface meets the tactile time output criteria and the current time of day is a second time, output, by the tactile output generator, a second tactile output pattern that is indicative of the second time, where the first tactile output pattern and the second tactile output pattern are different. Further, the one or more programs include instructions that, when executed, cause the device to, in response to detecting the sequence of touch inputs on the touch-sensitive surface, and in accordance with a determination that the sequence of touch inputs detected on the touch-sensitive surface does not meet the tactile time output criteria, forgo output of a tactile output pattern that is indicative of the current time of day.

Thus, devices are provided with faster, more efficient methods and interfaces for outputting time, thereby increasing the effectiveness, efficiency, and user satisfaction with such devices. Such methods and interfaces can optionally complement or replace other methods for outputting time.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
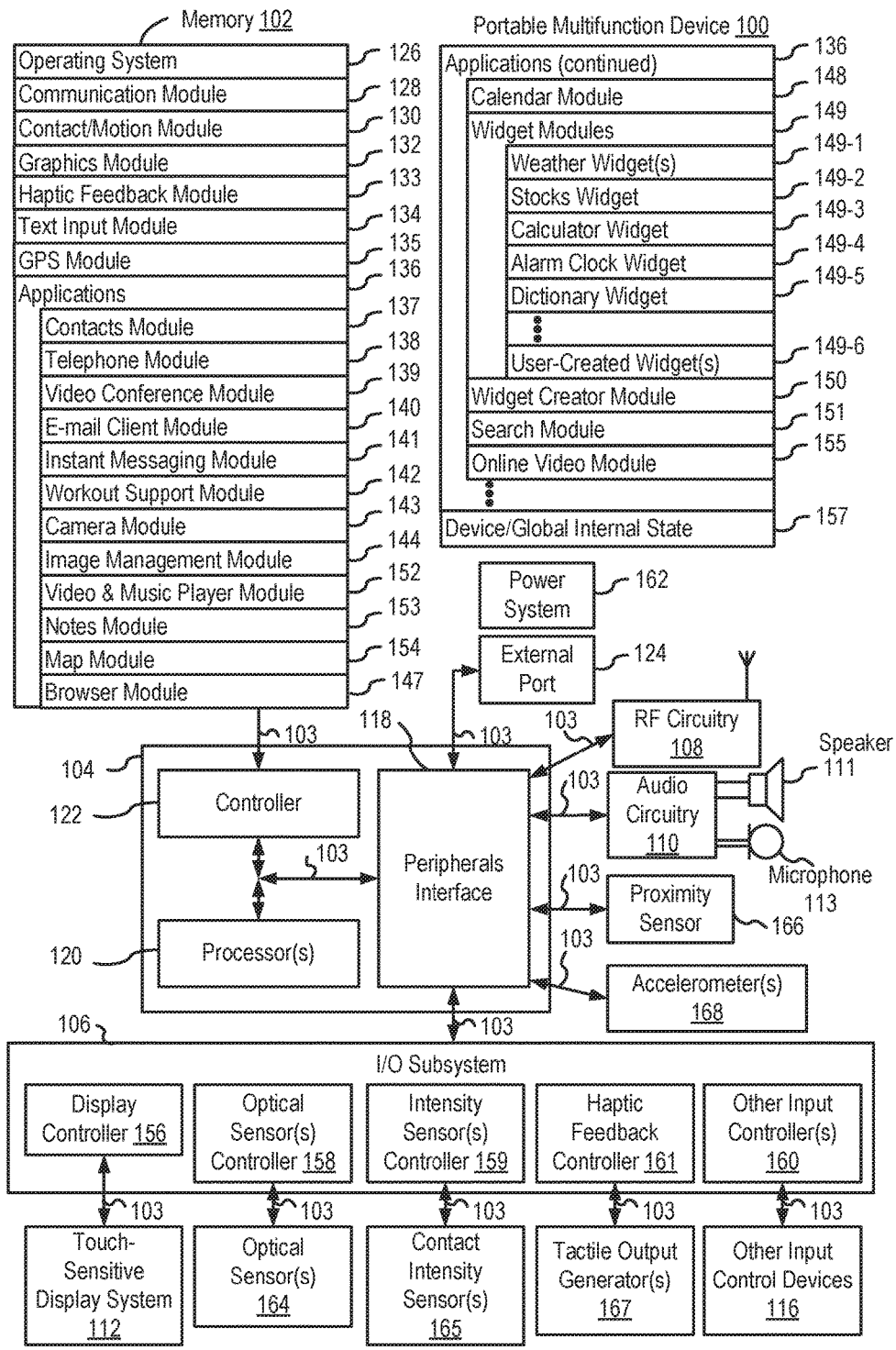
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

Many electronic devices provide a time of day visually, such as by outputting a clock time on a user interface presented on a display screen. However, such methods can be limiting and impractical in numerous situations. There is a need for an alternative or supplementary approach for a user to ascertain a clock time without requiring the user to view the display screen each time. For example, there is a need for outputting the clock time in an efficient and easy to understand manner that conveys the hours and minutes of a time without requiring their visual presentation. There is a need for a discreet method of outputting the time to a user without notifying surrounding members of the time or of the user's intentional request for the time. For example, there is a need to impart the time to the user without having to divert the user's attention to a display screen to view the time. Further, there is a need for improving accessibility features on electronic devices for low-vision or non-sighted users who are not easily able to view the display screen. Still further, there is a need to provide an alternative or supplemental approach to the audio output of information, for example for users who are hearing-impaired and/or in loud environments. Additionally, there is a need to output the clock time in an improved manner without significantly increasing burden on the processor and/or battery power consumption. This application is intended to address such issues and provide related advantages.

Below, FIGS. 1A-1B, 2, 3, 4A-4B, and 5A-5B provide a description of exemplary devices for performing the techniques for tactile time feedback. FIGS. 6A-6I illustrate exemplary touch inputs and tactile output patterns generated at a device that provides tactile time feedback. FIG. 7 is a flow diagram illustrating methods of tactile time feedback in accordance with some embodiments, such as those illustrated in FIGS. 6A-6I.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As an example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
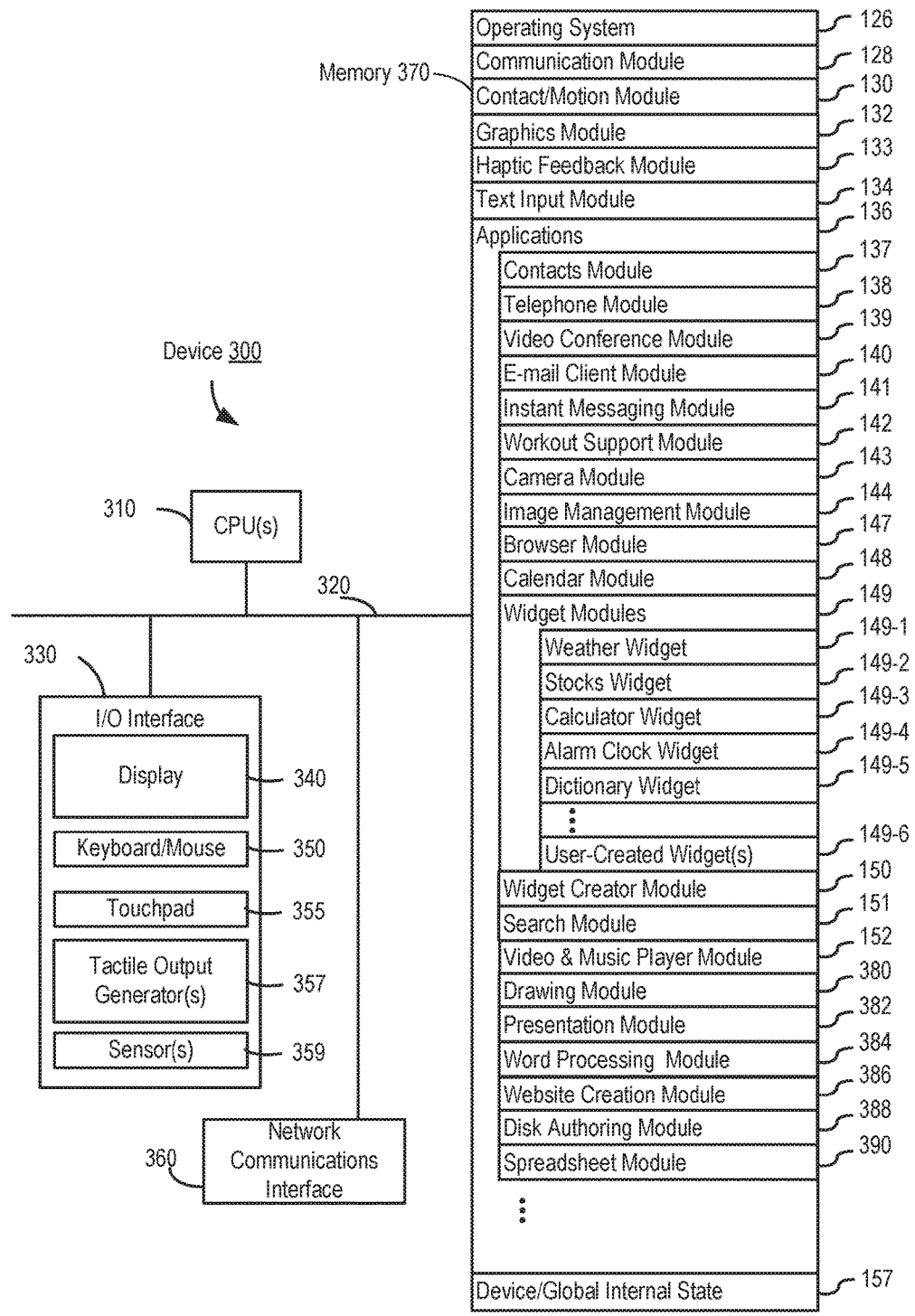
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). In some examples, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
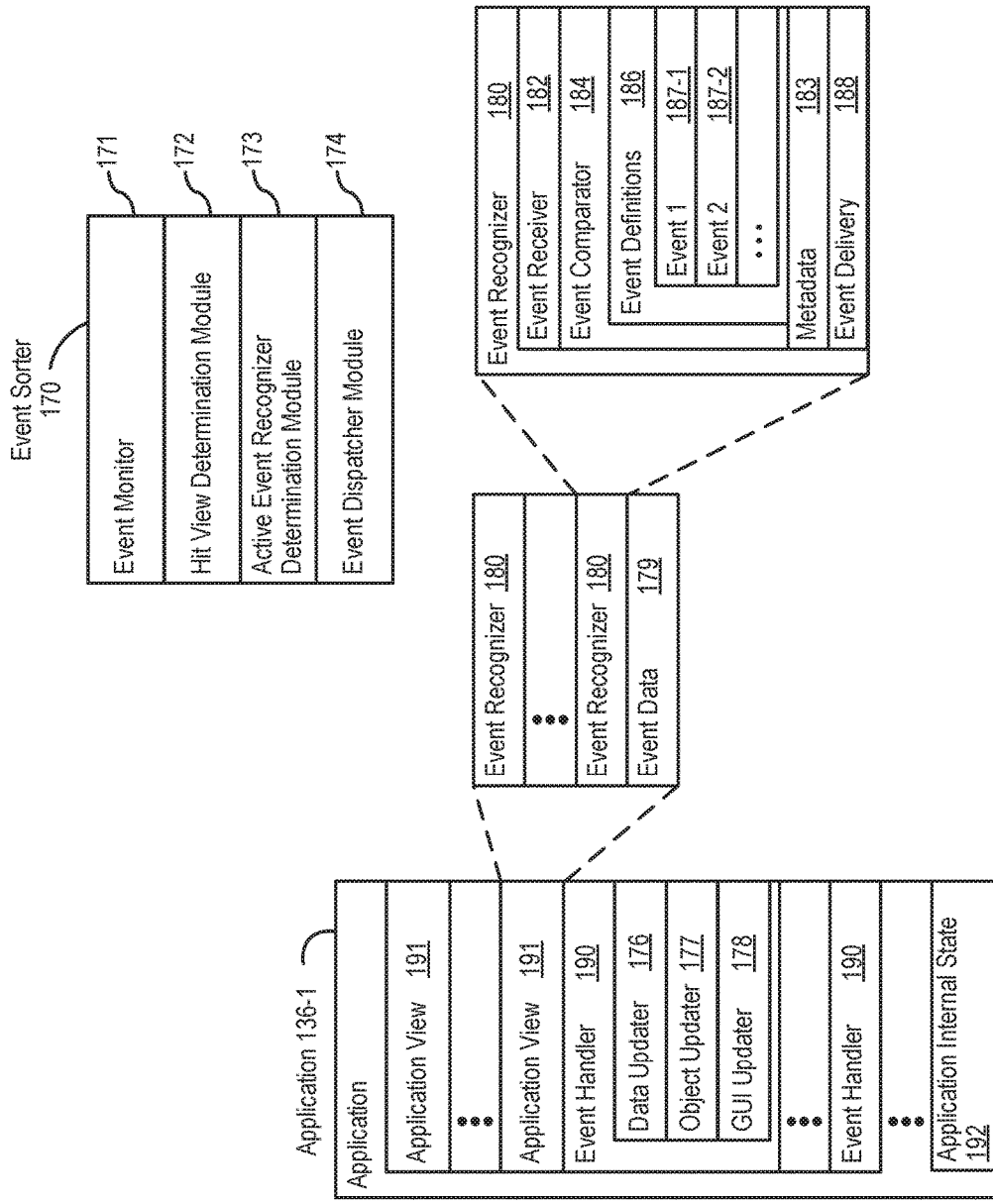
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In some examples, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
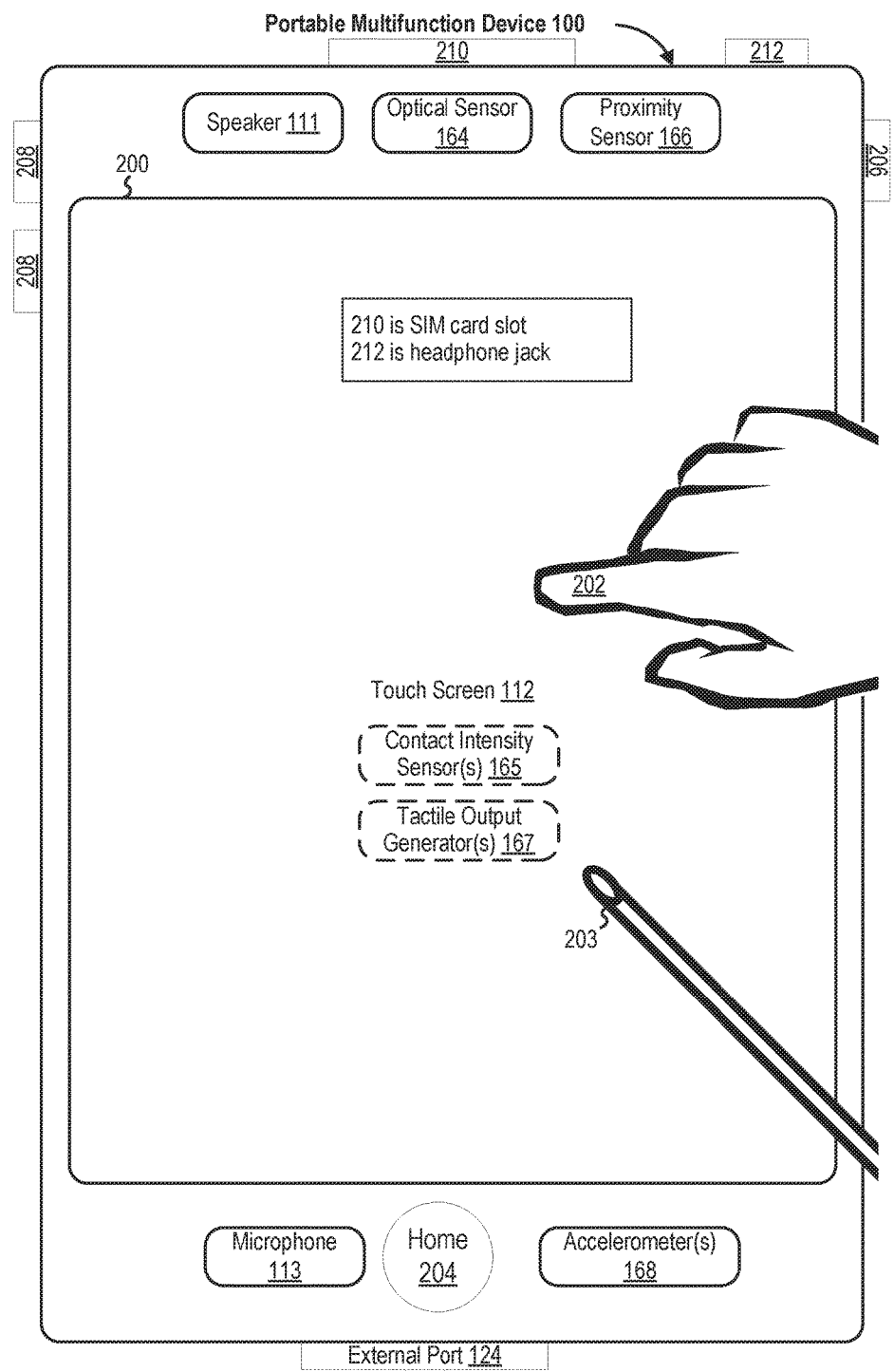
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
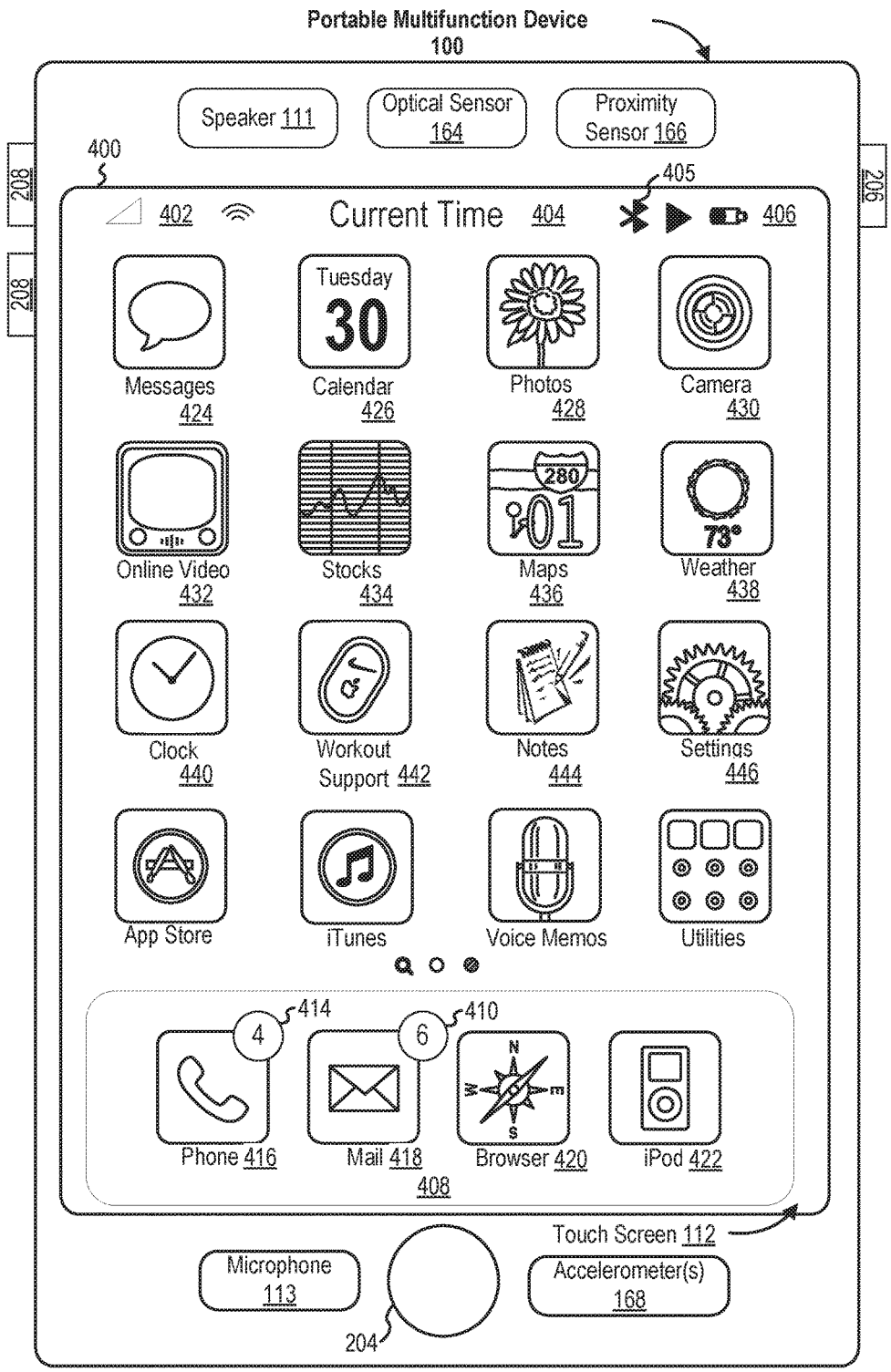
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
 Icon 416 for telephone module 138, labeled "Phone," which optionally includes an indicator 414 of the number of missed calls or voicemail messages;
 Icon 418 for e-mail client module 140, labeled "Mail," which optionally includes an indicator 410 of the number of unread e-mails;
 Icon 420 for browser module 147, labeled "Browser;" and
 Icon 422 for video and music player module 152, also referred to as iPod (trademark of Apple Inc.) module 152, labeled "iPod;" and Icons for other applications, such as:
 Icon 424 for IM module 141, labeled "Messages;"
 Icon 426 for calendar module 148, labeled "Calendar;"
 Icon 428 for image management module 144, labeled "Photos;"
 Icon 430 for camera module 143, labeled "Camera;"
 Icon 432 for online video module 155, labeled "Online Video;"
 Icon 434 for stocks widget 149-2, labeled "Stocks;"
 Icon 436 for map module 154, labeled "Maps;"
 Icon 438 for weather widget 149-1, labeled "Weather;"
 Icon 440 for alarm clock widget 149-4, labeled "Clock;"
 Icon 442 for workout support module 142, labeled "Workout Support;"
 Icon 444 for notes module 153, labeled "Notes;" and
 Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
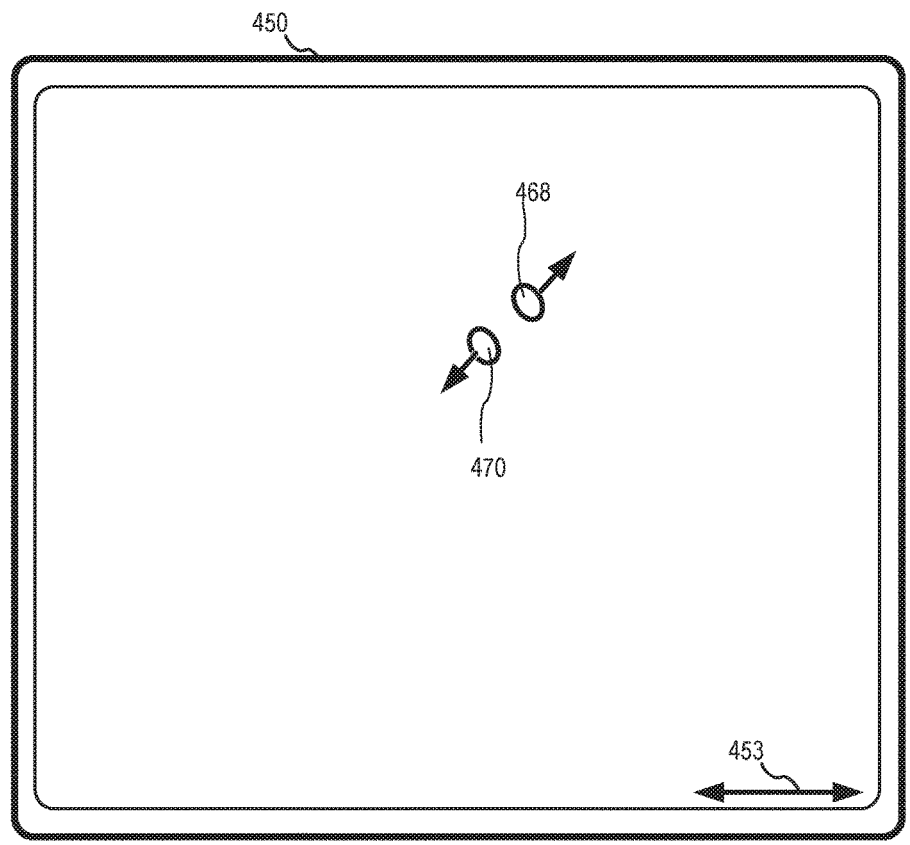
FIG. 4B illustrates an exemplary user interface for a multifunction device with a touch-sensitive surface that is separate from the display in accordance with some embodiments.
Figure 4B:
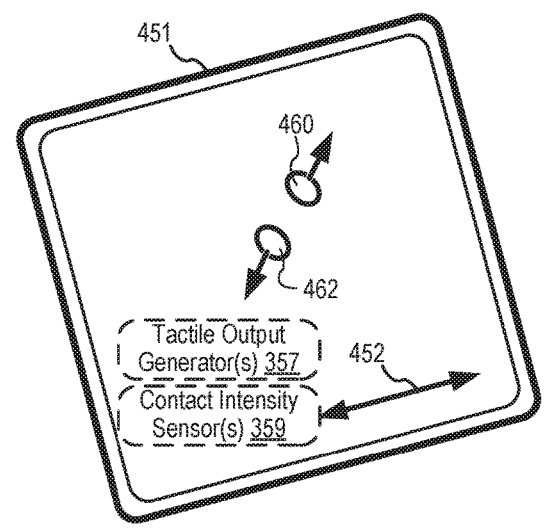

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). In some examples, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
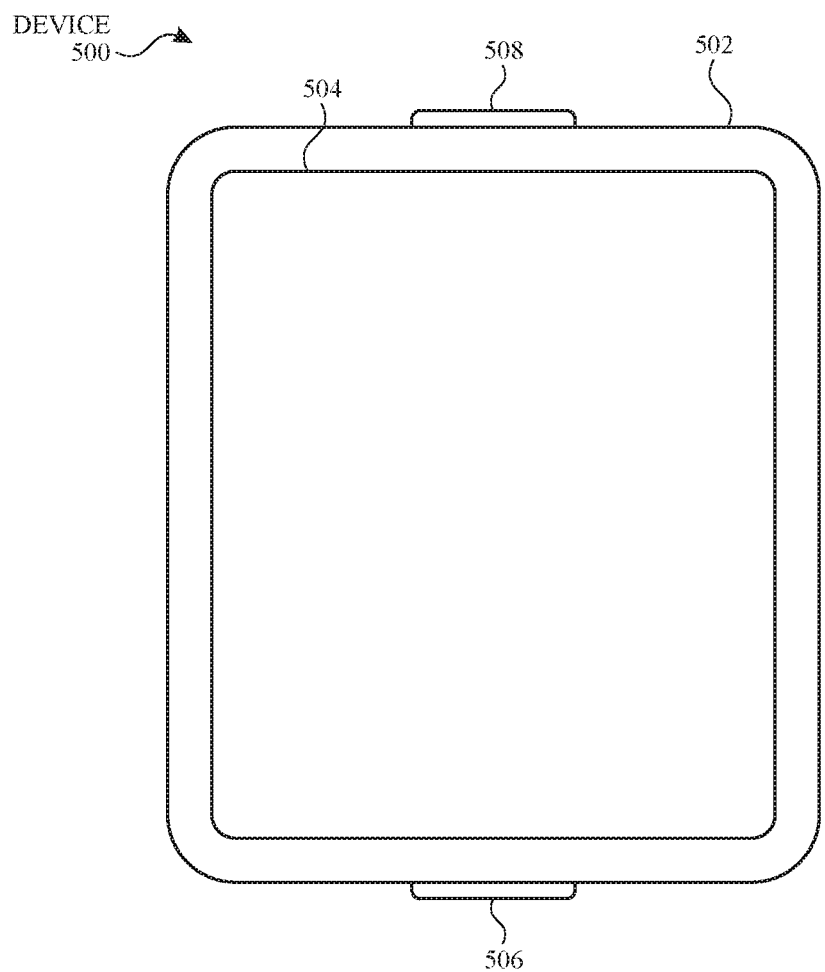
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
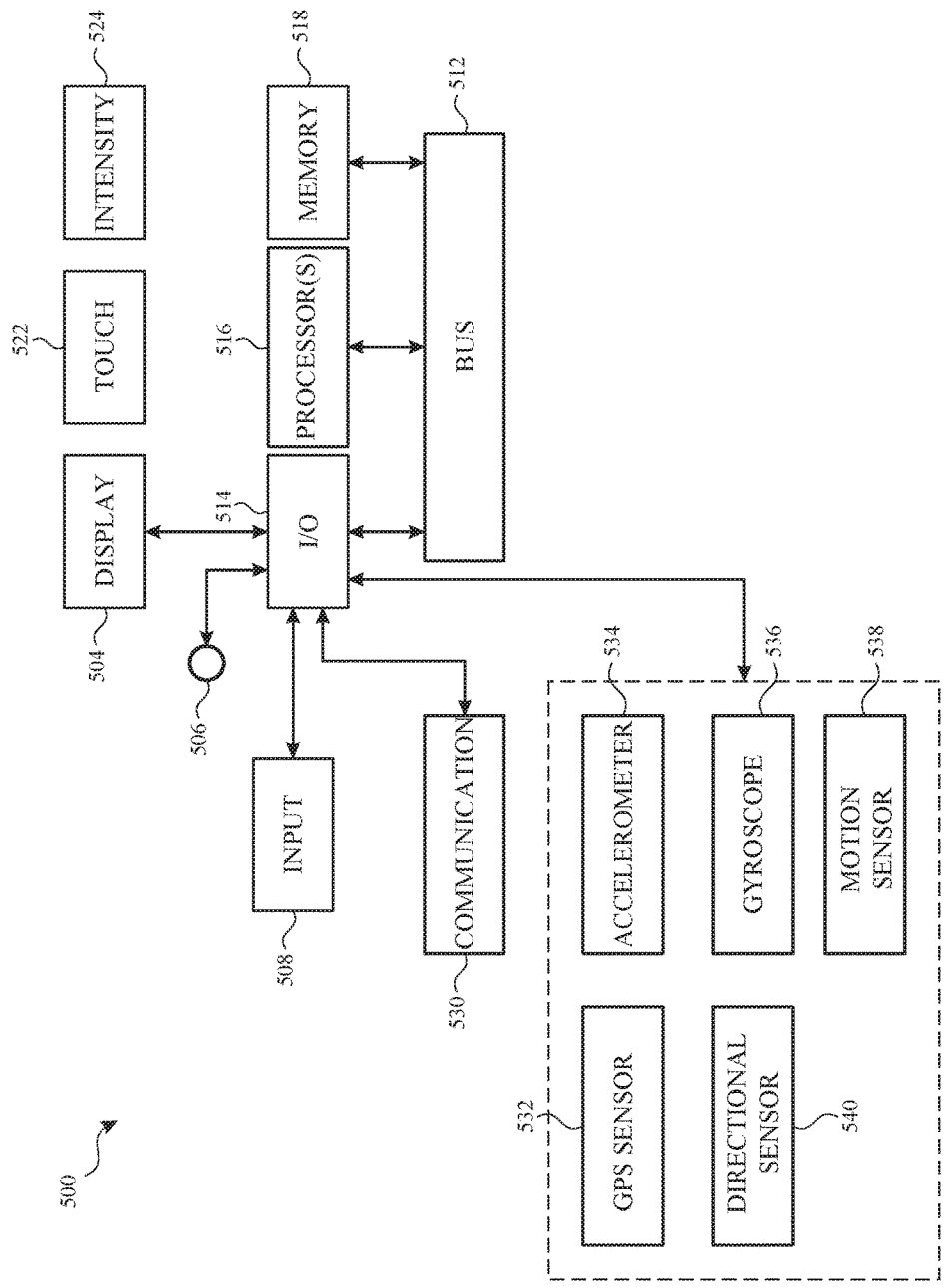
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of outputting time with tactile time feedback and associated processes that are implemented on an electronic device, such as portable multifunction device 100, device 300, or device 500. In some instances, tactile time can optionally be referred to as haptic time (e.g., haptic time feedback).

FIGS. 6A-6I illustrate exemplary methods for tactile time feedback, in accordance with some embodiments. The descriptions in these figures are used to illustrate the processes described below, including the processes in FIG. 7.

Figure 6A:
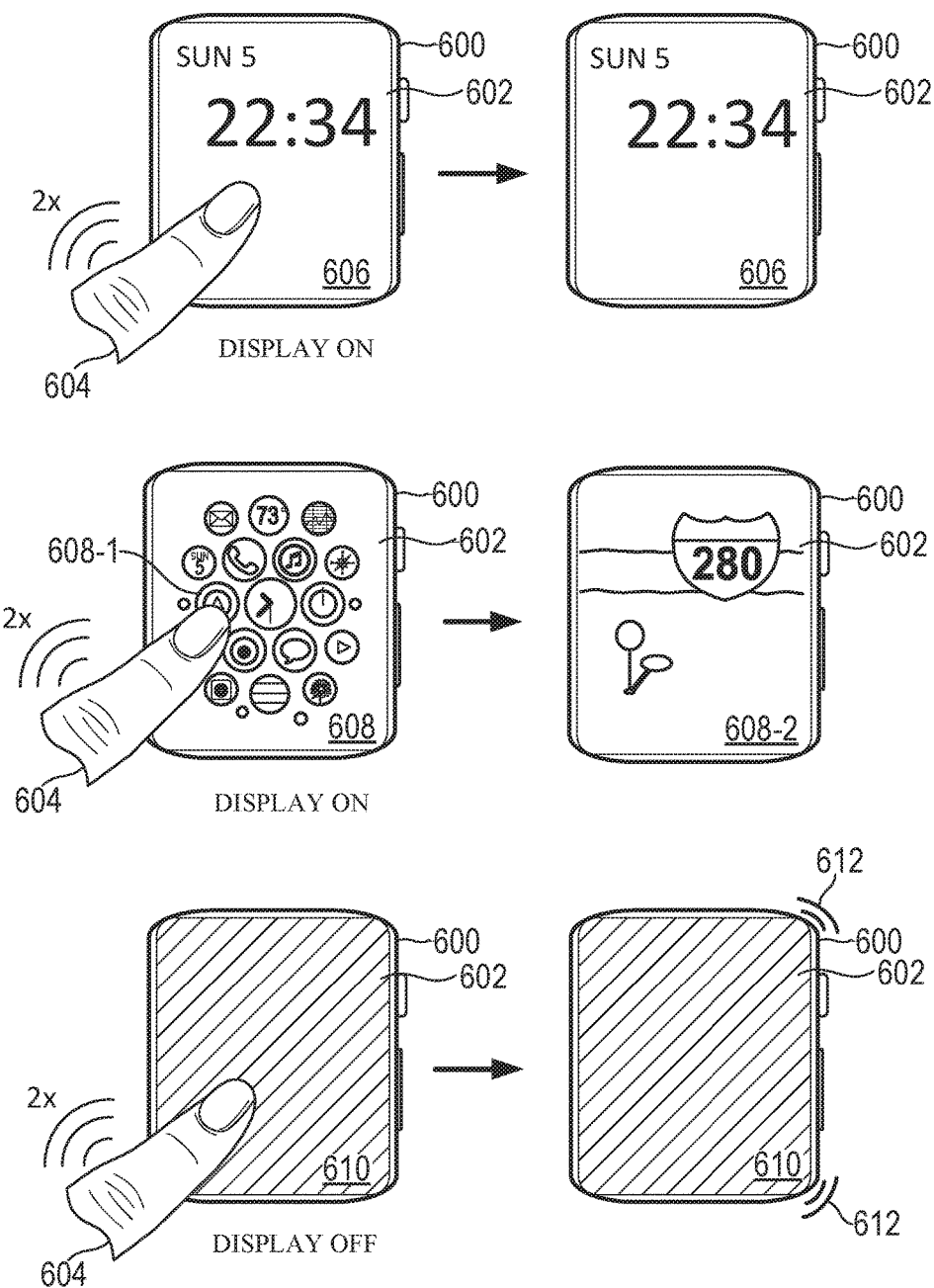
FIG. 6A illustrates an exemplary touch inputs at a device that provides haptic time feedback, in accordance with various embodiments of the present invention.
Figure 7:
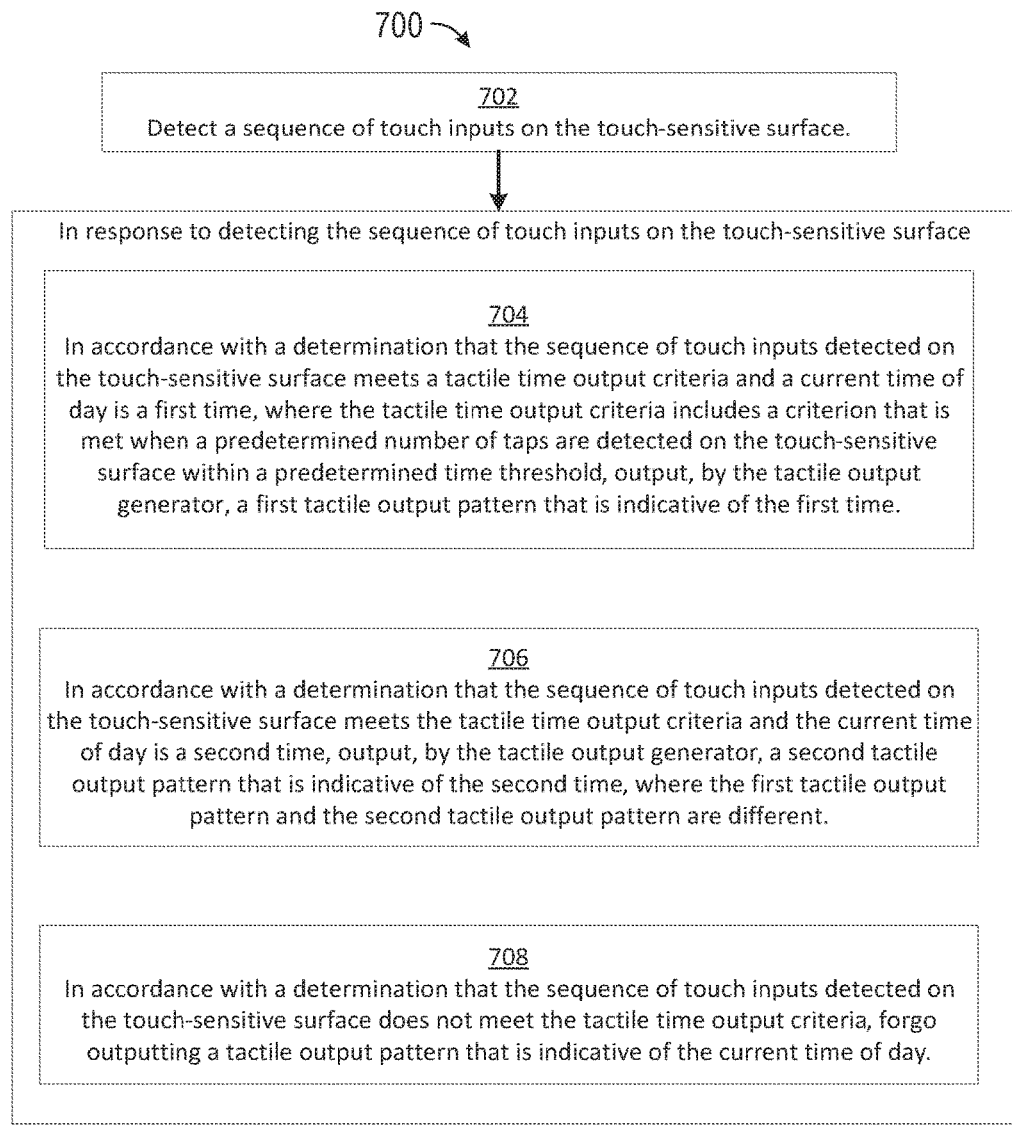
FIG. 7 is a flow diagram illustrating a method of tactile time feedback, in accordance with various embodiments of the present invention.

FIG. 6A illustrates an example electronic device 600 that includes some or all of the features described with respect to devices 100, 300, or 500. Device 600 includes a touch-sensitive surface 602 for receiving touch inputs 604, and further, optionally include a combined touch-sensitive surface and display screen, such as the touch screen 504 described above at FIG. 5A. It is noted that any display-related capabilities of the touch-sensitive surface 602 are optional for the present embodiments directed to tactile time feedback. In some examples as demonstrated in FIG. 6A, the touch-sensitive surface 602 displays a clock interface 606 that includes a date (e.g., "SUN 5" for Sunday the $5^{th}$") and a current time of day (e.g., "22:34" or 10:34 PM). In some examples, the touch-sensitive surface 602 optionally displays a menu of application icons 608 that launch various applications associated therewith for display on the touch-sensitive surface 602. In some implementations, the device 600 is a wearable electronic such as a wristwatch that offers visual display of a clock time in addition to haptic feedback of the clock time. Such haptic feedback is, optionally, generated by a tactile output generator housed within or otherwise in operative communication with the device 600 to generate tactile outputs that indicate the clock time. For example, the tactile output generator can optionally include some or all of the features described with respect to the tactile output generator 167 of FIG. 1.

As illustrated at FIG. 6A, the device 600 receives touch inputs on the touch-sensitive surface 602 while the display is on and displaying various user interfaces (e.g., clock interface 606, menu of application icons 608) and/or while the display is off 610 or otherwise dark, which can optionally correspond to the device 600 being in a sleep or standby mode where the device 600 is still capable of detecting touch contacts received on the touch-sensitive surface 602. In some examples, the device detects a touch input 604 on the touch-sensitive surface 602 and in response outputs tactile time feedback indicative of the current time. For example, the device 600 detects the touch input 604 on the touch-sensitive surface 602 and determines whether the touch input 604 meets certain tactile time output criteria. If the device 600 determines that the tactile time output criteria (or in some cases, a criterion) are met, then the device 600 can optionally respond to the touch input 604 by generating, by way of the tactile output generator, a tactile output pattern of vibrations or pulses 612 that is indicative of the current time. In practice, a user wearing or otherwise in contact with the device 600 can optionally feel a tactile sensation of a pattern of pulses that represents the current time. On the other hand, if the device 600 determines that the touch input 604 does not meet the tactile time output criteria, then the device can optionally not respond with haptic feedback of the time, as demonstrated in the display-on illustrations of FIG. 6A and described further below. In that case, the device 600 optionally responds with non-tactile-time-related functions (e.g., launching an application corresponding to an icon at the input location).

Still referring to FIG. 6A, in some cases, the touch input 604 is a sequence of touch inputs, such as multiple finger taps, or multiple finger down events followed by multiple finger-up (liftoff) events at the same or substantially same position. In response to detecting the sequence of touch inputs 604 on the touch-sensitive surface 602, the device 600 can optionally determine if the sequence of touch inputs meets the tactile time output criteria. The tactile time output criteria can optionally include a criterion that is met when a predetermined number of taps of the touch input 604 are detected within a predetermined time threshold. For example, the device 600 determines whether the touch input 604 includes a first tap and a second tap that constitute a double-tap sequence (e.g., "2×" in FIG. 6A), where the taps are considered a double-tap if they are received within a predetermined time threshold of each other. In some examples, the first tap and the second tap are a double-tap sequence when they are received within less than 0.5 seconds of each other. In some examples, the predetermined time threshold is defined by a range of values, or is a value within a range between about 0.1 seconds to 0.8 seconds. Other tap sequences and predetermined time thresholds can optionally include, for example, a triple-tap sequence.

Additionally and/or alternatively, the tactile time output criteria include one or more other criterion. As demonstrated in FIG. 6A, the tactile time output criteria include a criterion that is met when the touch input 604 is detected on the touch-sensitive surface 602 while the display is off 610, or in sleep or standby mode. For instance, as demonstrated in FIG. 6A, the double tap touch inputs 604 on the touch-sensitive surface 602 while the screen is on (e.g., clock interface 606, menu of application icons 608) do not generate any tactile time feedback. On the other hand, the same double tap touch input 604 on the touch-sensitive surface 602 when the display is off 610 causes output of pulses 612 that correspond to a tactile feedback for the current time. The display screen can optionally remain off 610 while the tactile output pattern is emitted. As demonstrated in FIG. 6B, the display 602 can optionally be on while the tactile output pattern is emitted.

Figure 6B:
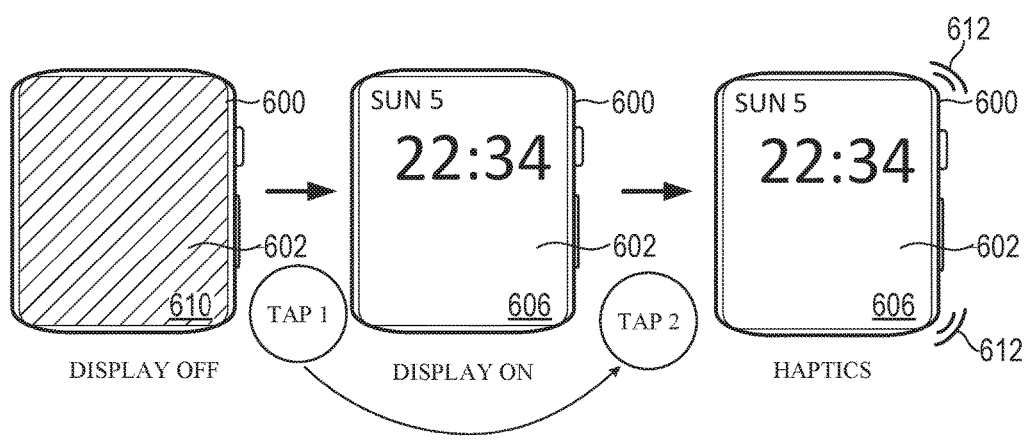
FIG. 6B illustrates an example touch input for tactile time feedback, in accordance with various embodiments of the present invention.

For example, as shown in FIG. 6B, a double-tap touch input that includes tap 1 (e.g., first tap) and tap 2 (e.g., second tap) received within the predetermined time threshold activates the display screen and outputs tactile time. As shown at FIG. 6B, tap 1 that is received while the display is off (610) causes the display to turn on and/or present the clock interface 606 showing the current time. Tap 2 activates or otherwise causes activation of the tactile output generator to generate pulses 612, such as pulses of the tactile output pattern corresponding to the current time. It is noted that while other gestures can optionally wake the display screen from an off or sleep mode, such as a wrist-raise or wrist-turning gesture detected by the device 600 for causing the display to turn on, such gestures can optionally not be associated with the touch inputs contemplated herein for instantiating the tactile time feedback.

Additionally and/or alternatively, the tactile time output criteria include a criterion that is met when the sequence of touch inputs 604 is detected after a predetermined threshold amount of time has elapsed during which no notification that was not a tactile time output was generated by the device 600. For example, the criterion is met when the device 600 was in an inactive state prior to receiving the touch inputs 604, whereby the inactive state is a duration of time during which no notification alerts, audio output, tactile outputs not related to time, and/or other accessibility-based features were output. It is contemplated that tactile time feedback during the inactive state is permitted such that multiple requests for tactile time feedback, such as replay of tactile time feedback, can optionally be received and met. In some examples, no output of any kind, including tactile time feedback, is permitted during the inactive state.

In some examples, additionally and/or alternatively, the tactile time output criteria include a criterion that is met when the sequence of touch inputs 604 is detected after a predetermined threshold of time has elapsed during which the device 600 did not detect any user input that was not a sequence of touch inputs directed to outputting a tactile output pattern. For example, the criterion is met when the device 600 was in an inactive state characterized by a duration of time where no touch inputs on the touch-sensitive surface 602, depression of a depressible button at the device 600, rotation of a rotatable element on the device 600, movement of the device 600 of the detected by an accelerometer thereof (e.g., wrist raise) that results in activation of a feature at the device 600, or any other type of user interaction were detected. Still, it is contemplated that user touch inputs such as the double-tap touch input 604 are permitted during this inactive state in order to allow replay of tactile time feedback if requested.

Figure 6C:
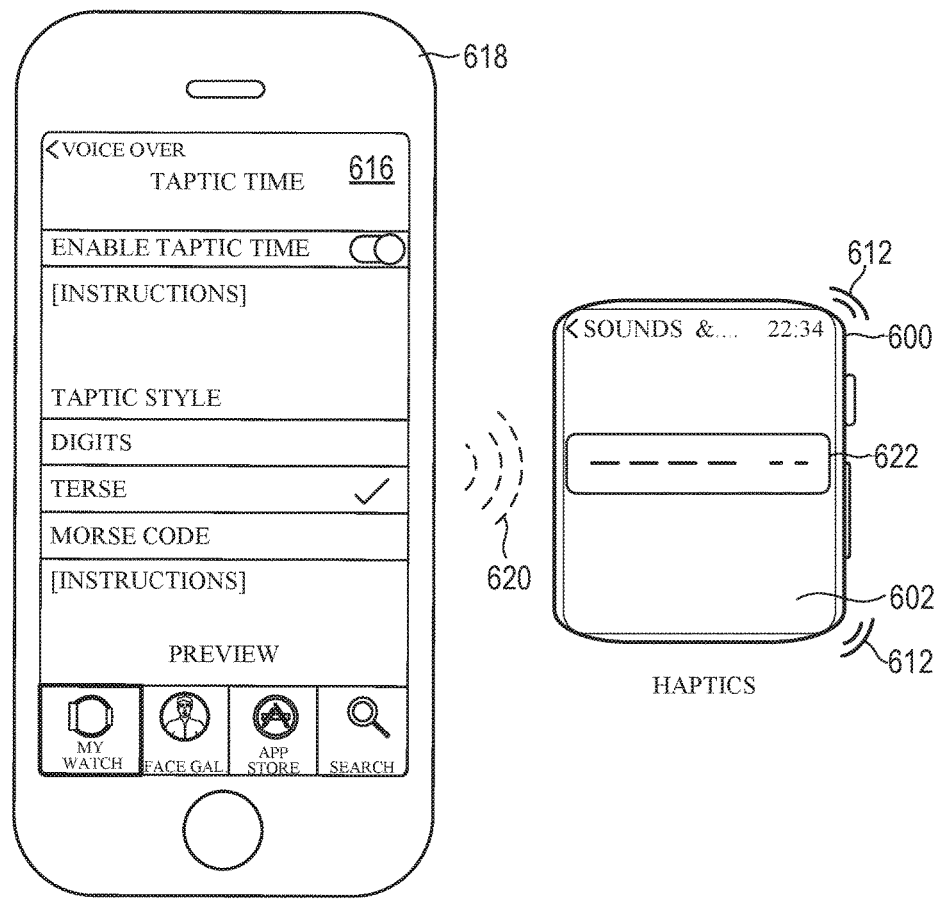
FIG. 6C illustrates an example settings user interface for tactile time feedback, in accordance with various embodiments of the present invention.

Turning now to FIG. 6C, in some examples, additionally and/or alternatively to the foregoing tactile time output criteria, the tactile time output criteria include a criterion that is met when an accessibility mode at the device 600 is enabled. The accessibility mode can optionally include one or more settings associated with features that improve the use of the device 600 by low-vision or non-sighted users. In some examples, the criterion is met when the accessibility mode is generally turned on, for instance, from a general settings interface associated with the device 600. Additionally and/or alternatively, the criterion is met when the accessibility mode includes a settings user interface 616 demonstrated at FIG. 6C where the taptic time is enabled or disabled by a soft toggle. The settings user interface 616 can optionally include instructions for interpreting the output corresponding to a selected output style, such as a digits (e.g., exact time) output, a terse (e.g., approximated time) output, a Morse code output style, and so on. The settings user interface 616 can optionally include instructions associated with the selected output style that explain how to interpret tactile output patterns of the selected output style. In another aspect, a preview shows, visually (e.g., a listing of dash and dot markings for an example time) and/or by haptic output, an example time to help aid the user in selecting a taptic style. Such demonstrations can optionally be output at the device providing the settings user interface 616, such as at an external mobile phone 618 in operative communication with the device 600 as shown at FIG. 6C, or can optionally be demonstrated at the device 600 itself. For example, haptic instructions 620 are sent from the mobile phone 618 to the device 600, where the instructions 620 include preview instructions and/or various haptics settings. In some examples, the settings user interface 616 is provided by the device 600 itself. In some examples, a visual indication 622 of the example tactile output pattern is presented for preview, along with the example pulses of the haptic output, at the device 600 and/or mobile phone 618.

Turning back to FIG. 6A, in other cases where the sequence of touch inputs 604 detected on the touch-sensitive surface 602 does not meet the tactile time output criteria, the device 600 can optionally perform a function other than outputting a tactile output pattern that is indicative of the current time of day. In some examples, the function other than outputting the tactile output that is indicative of the current time is determined based on a location of the second tap input on the touch-sensitive display or touch-sensitive surface 602. For example, as also demonstrated in FIG. 6B, the device 600 turns on display in response to detecting the first tap. Subsequently, the device can optionally display additional information, for example, about calendar events for a user of the device 600 when the second tap input is detected at a representation of a calendar application. In some examples, the device 600 turns on the display in response to the first tap and displays additional information about weather forecasts when the second tap input is detected at a location corresponding to a representation of a weather application.

In some examples, as demonstrated in part at FIG. 6A, the display of the touch-sensitive surface 602 is already on when the touch input 604 is detected. In that case, the location of the touch input 604, whether a first or subsequent tap thereof, can optionally activate an application affordance or other feature located at the location of the touch input 604.

For example, the touch input 604 is detected at a location corresponding to a navigation application 608-1 that is displayed on the menu of application launch icons 608. The touch input 604 can optionally activate and cause display of a corresponding navigation application 608-2.

Figure 6D:
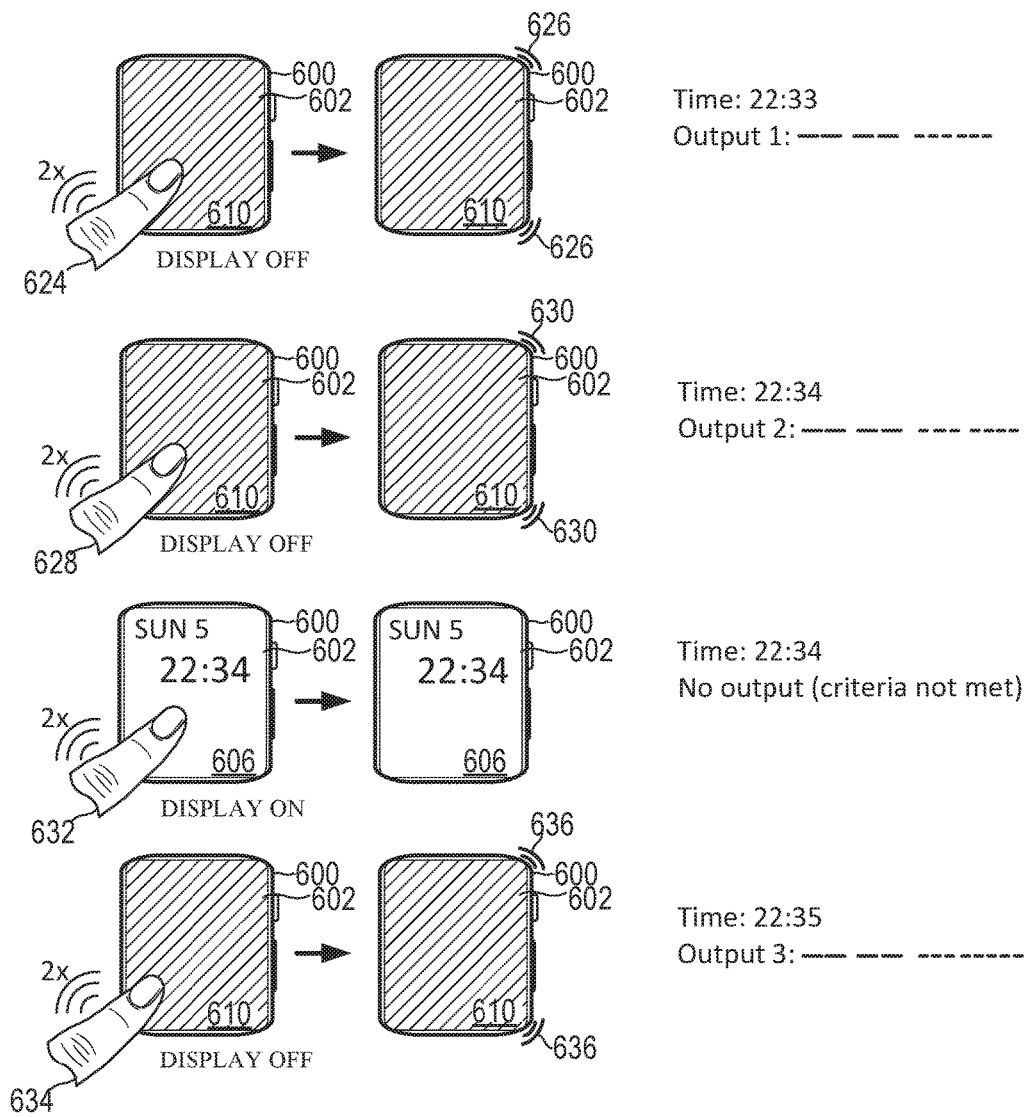
FIG. 6D illustrates example touch inputs for generating tactile time feedback that indicate various current times, in accordance with various embodiments of the present invention.

Turning now to FIG. 6D, various examples of touch inputs for generating tactile time feedback are demonstrated. In some examples, a sequence of touch inputs 624 is detected on the touch-sensitive surface 602 while a current time of day is a first time (e.g., 22:33). In accordance with a determination that the sequence of touch inputs 624 meets the tactile time output criteria, the device 600 outputs a first tactile output pattern (e.g., output 1) of pulses 626 that is indicative of the first time. In some examples, in response to determining that the tactile time output criteria is met, the device 600 can optionally obtain the current time (e.g., the first time), determine a tactile output pattern that corresponds to the obtained current time in accordance with a taptic output style (e.g., exact time, approximate time, Morse code time, etc.), and cause the tactile output generator to output the pulses 626 based on the determined tactile output pattern. In the present example at FIG. 6D, the taptic output style corresponds to an exact time mode, where each digit of the hours and minutes are represented by corresponding pulses, as described further below. It is contemplated that outputting the sequence of tactile outputs distinguishes the first time from other times of day.

In a further example at FIG. 6D, a sequence of touch inputs 628 is detected on the touch-sensitive surface 602 while a current time of day is a second time (e.g., 22:34). In accordance with a determination that the sequence of touch inputs 628 meets the tactile time output criteria, the device 600 outputs a second tactile output pattern of pulses 630 that is indicative of the second time. Here, it is contemplated that outputting the sequence of tactile outputs distinguishes the second time from other times of day. In a further example, a sequence of touch inputs 632 is detected on the touch-sensitive surface 602 while the current time of day is still at the second time (e.g., 22:34). However, the sequence of touch inputs 632 is determined not to meet the tactile time output criteria even though the sequence represents a double-tap touch input. For example, the display screen is on while receiving the sequence of touch inputs 632 and therefore does not satisfy the criteria for display being off. In this case, the device 602 does not output any tactile output pattern that indicates the current time of day. In yet a further example, a sequence of touch inputs 634 is detected on the touch-sensitive surface 602 while a current time of day is a third time (e.g., 22:35). In accordance with a determination that the sequence of touch inputs 634 meets the tactile time output criteria, the device 600 outputs a third tactile output pattern of pulses 636 that indicates the third time. The sequence of tactile outputs can optionally distinguish the third time from other times of day.

Figure 6E:
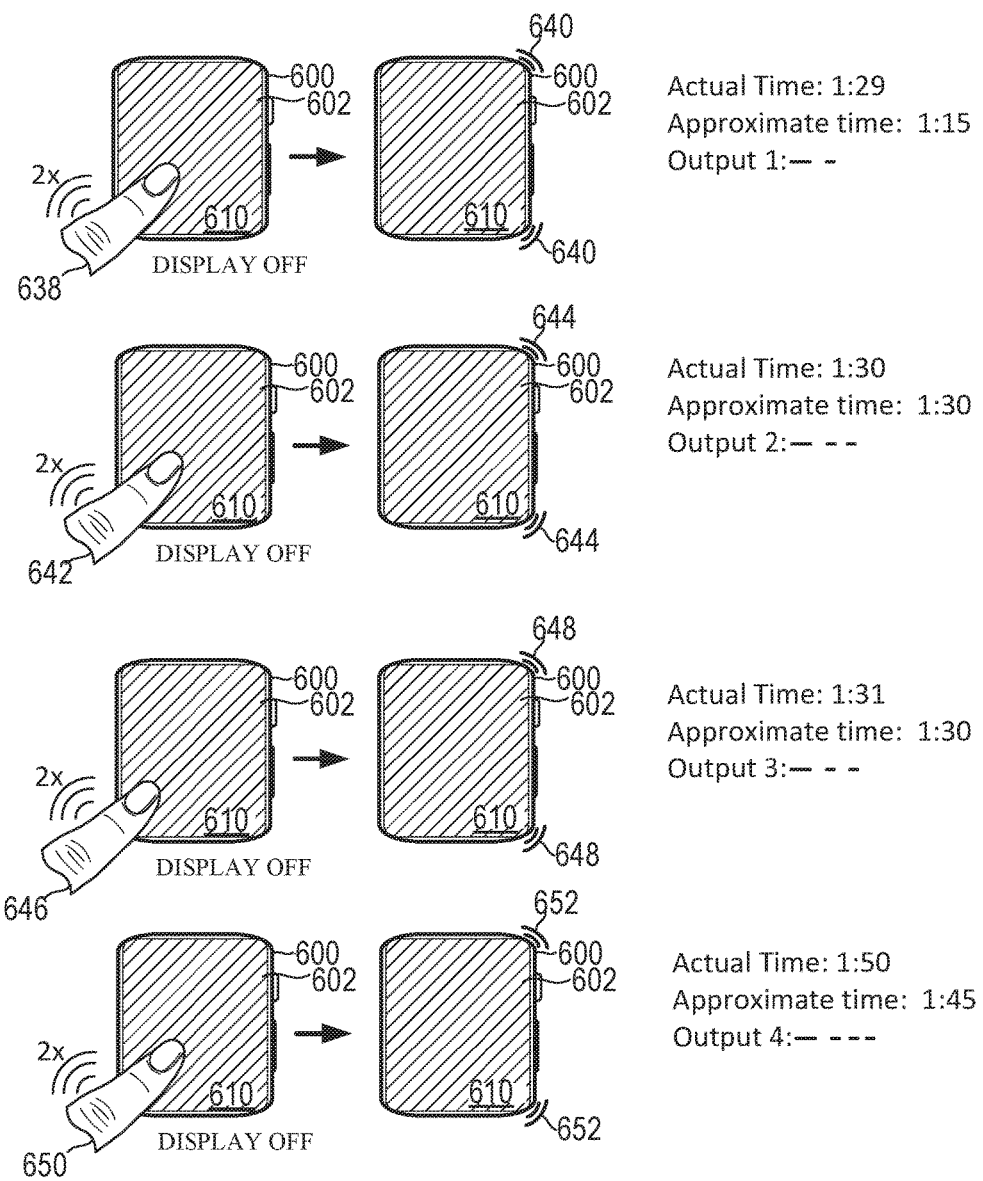
FIG. 6E illustrates example touch inputs for generating tactile time feedback that indicate various approximated current times, in accordance with various embodiments of the present invention.

Turning now to FIG. 6E, further examples of touch inputs for generating tactile time feedback are shown. In these examples, the device 600 can optionally be configured to output an approximated time according to various embodiments described below. In the present example, a sequence of touch inputs 638 is detected on the touch-sensitive surface 602 while a current time of day is a first time (e.g., 1:29). In accordance with a determination that the sequence of touch inputs 638 meets the tactile time output criteria, the device 600 outputs a first tactile output pattern of pulses 640 that is indicative of an approximated first time (e.g., 1:15). For example, in response to determining that the tactile time output criteria is met, the device 600 obtains the current time (e.g., the first time), determines an approximate time based on rounding up or rounding down the actual minutes to a predetermined fractional increment of an hour (e.g., rounding down the first time 1:29 to the nearest 15-minute increment at 1:15), determines a tactile output pattern that corresponds to the approximated current time (e.g., 1:15) in accordance with a taptic output style (e.g., exact time, approximate time, Morse code time, etc.), and causes the tactile output generator to output the pulses 640 based on the determined tactile output pattern. Other examples for approximated time output are possible, as described further below.

In a further example at FIG. 6E, a sequence of touch inputs 642 is detected on the touch-sensitive surface 602 while a current time of day is a second time (e.g., 1:30). In accordance with a determination that the sequence of touch inputs 642 meets the tactile time output criteria, the device 600 outputs a second tactile output pattern of pulses 644 that is indicative of an approximated second time (e.g., 1:30). Here, for example, the approximated time output mode outputs the actual time since the actual time falls on the predetermined fractional increment (e.g., 15-minute increments) at 30 minutes past the hour. In yet a further example, while the current time is the second time, the device detects a subsequent sequence of touch inputs 646. In response to detecting the subsequent sequence of touch inputs 646, and in accordance with a determination that the subsequent sequence of touch inputs 646 meets the tactile time output criteria and the current time of day has changed to a third time (e.g., 1:31), the device 600 outputs a third tactile output pattern that is indicative of an approximated third time (e.g., 1:30). Here, for example, the approximated time output mode outputs the same pattern for the third tactile output pattern and the second tactile output pattern to indicate the same approximated time (e.g., 1:30), although the actual third time (e.g., 1:31) is different than the actual second time (e.g., 1:30), but the difference is less than the predetermined fractional increment of time (e.g., 15-minute increment).

In still a further example at FIG. 6E, a sequence of touch inputs 650 is detected on the touch-sensitive surface 602 while a current time of day is a fourth time (e.g., 1:50). In accordance with a determination that the sequence of touch inputs 650 meets the tactile time output criteria, the device 600 outputs a fourth tactile output pattern of pulses 652 that is indicative of an approximated fourth time (e.g., 1:45). Here, for example, the fourth tactile output pattern is different than the first, second, and third tactile output patterns. The actual fourth time (e.g., 1:50) is different than the second time (e.g., 1:30), and the difference is more than the predetermined fractional increment of time (e.g., 15-minute increment). As shown in FIG. 6E, the minutes in the approximated time mode are output with pulses indicate a corresponding number of predetermined fractional increments. For instance, for the 15-minute increments, one pulse is output for each 15-minute increment.

Turning back to FIG. 6C, the tactile output generator of the device 600 can optionally output tactile output patterns in various styles that can be selected by the user. Merely by way of example, such taptic styles include a digits mode that outputs an exact or actual time, a terse mode that outputs an approximated time based on the actual time, and a Morse code mode that can optionally output either the exact or the actual time using Morse code format. It is noted that other styles can optionally be contemplated, and various features from various different styles can be combined. Further, the tactile output patterns can optionally indicate a current time in a 12-hour time format and/or a 24-hour time format selectable by the user. Merely by way of example, in the 12-hour format, the tactile output generator can optionally output a single pulse indicating a current time of 1:00 AM, and a single pulse for a current time of 1:00 PM, while in the 24-hour format, the tactile output generator can optionally output a single pulse for a current time of 1:00, and 13 pulses for a current time of 13:00. In some embodiments, the AM or PM is indicated by a unique pulsing sequence that follows or precedes output of the tactile output pattern corresponding to the current time to indicate whether the time is in AM or PM.

Further, as demonstrated in the various tactile output pattern examples corresponding to various taptic styles below, the tactile output generator can optionally output different tactile profiles to distinguish output of hours values from minutes values, tens place digits from ones place digits, large fractional increments of an hour from smaller fractional increments of an hour, and so on. Merely by way of example, a tactile output pattern includes a first portion and a second portion that is distinct from the first portion in at least one of an output duration (e.g., a duration per pulse or vibration) and an output intensity (e.g., a pulse or vibrational strength, amplitude, and/or frequency of vibration). In some examples, a tactile output pattern corresponding to an hour-portion of a current time and a subsequently output tactile output pattern corresponding to a minute-portion of the current time is be separated by a predetermined period of time, such as a delay or pause, in which no tactile output is generated by the device to distinguish the hours from the minutes.

In an example of a taptic style, a tactile output pattern includes an hour-portion that is determined based on an hour value of a requested or current time and/or a minute-portion that is determined based on a minute value of the current time. In some examples, this taptic style corresponds to an exact time, exact hour, and/or exact minute output. The hour-portion may include a tens place subportion corresponding to a tens digit of the hour value and a ones place subportion corresponding to a ones digit of the hour value. In this example, outputting a pulsing sequence corresponding to the hour-portion includes outputting the tens place subportion that includes a number of pulses corresponding to, or otherwise equal to, a value in a tens place of the hour value, and a outputting the ones place subportion that includes a number of pulses corresponding to, or equal to, a value in the ones place of the hour value. The tens place subportion is output before the ones place subportion is output. In some examples, the tens place subportion is output with a primary vibration profile, such as vibrational characteristics that define at least one of a long output duration and a strong output intensity per pulse, while the ones place subportion is output at a secondary vibration profile that at least one of a short output duration and a low output intensity per pulse. Further, the tactile output generator can optionally forgo outputting the tens place subportion when the value in the tens place is zero, and/or forgo outputting the ones place subportion when the value in the ones place is zero. For instance, for a current time of 09:12, the hours value is "09", where the tens place value is "0" and the ones place value is "9". In this example, no pulses are generated for the tens place value of "0" and the first tactile output related to the current time corresponds to the output of "9", such as nine short and light pulses. In some examples, where the current time is 10:23, the hours value is "10", where the tens place value is "1" and the ones place value is "0". Here, no pulses are generated for the ones place value of "0". In this case, after a tactile output that indicates the "1" value (e.g., a single long and strong pulse), a pause where no pulses are output can optionally represent the ones value being zero. In another further aspect, a second pause following the first pause can optionally indicate an end of the hours-portion output and a beginning of the minutes-portion output.

In similar fashion, the minute-portion can optionally include a tens place subportion and a ones place subportion. The tens place subportion and the ones place subportion are both determined based on a tens value and a ones value, respectively, of the minute value of the current time. In some examples, the tens place subportion and the ones place subportion are determined based on a tens value and a ones value, respectively, of an approximated minute value of the current time. For instance, the minutes are be rounded up or down to a nearest increment, such as 5-minute increments. Merely by way of example, for a current time of 09:12, the minute value is "12", where a value of the tens place is 1 and a value of the ones place is 2. On the other hand, an approximated minute value can optionally be "10" corresponding to an approximated time of "09:10" when the minutes are rounded up or down to the nearest 5-minute increment. In that case, a value of the tens place is 1 and a value of the ones place is 0. Outputting the minute-portion can optionally include outputting the tens place subportion with a number of pulses corresponding to, or equal to, a value in the tens place of the minute value or approximated minute value, followed by outputting the ones place subportion with a number of pulses corresponding to, or equal to, a value in the ones place of the minute value or approximated minute value. It is further noted that vibrations or pulses corresponding to the tens place subportion and the ones place subportion can optionally be distinguished. For instance, the tens place subportion can optionally be output with each pulse having a primary tactile output profile defining at least one of a first output duration and a first output intensity (e.g., long duration, strong intensity) and the ones place subportion can optionally be output with a secondary tactile output profile defining at least one of a second output duration that is different from the first output duration and a second output intensity that is different from the first output intensity (e.g., short duration, light intensity). Further, it is noted that no pulses are output for a tens value or a ones value of zero. Instead, a pause or delay can optionally be output as a placeholder in the tactile reading of the time.

In an example of a taptic style, a tactile output pattern includes an hour-portion that represents an hour value by major-hour increments and minor-hour increments. In some examples, this taptic style corresponds to an exact time and/or exact hour output. For example, the hour-portion includes a major subportion and a minor subportion. The major subportion can optionally be determined based on a number of major hour increments in the hour value. The minor subportion can optionally be determined based on a number of minor hour increments in the hour value remaining after the major hour increments are determined. Further, each major hour increment is greater than one hour and greater than each minor hour increment. A major increment can optionally be a 5-hour increment while a minor hour increment can optionally be a 1-hour increment. Outputting the hour-portion can optionally include outputting the major subportion with a number of pulses corresponding to, or otherwise equal to, a number of major hour increments of the hour value, while outputting the minor subportion can optionally include outputting a number of pulses corresponding to, or equal to, a number of minor hour increments of the hour value after the major hour increments are determined. The major subportion can optionally be output before the minor subportion is output. Further, the major subportion and the minor subportion can optionally be distinguished from one another by different tactile output profiles for pulses. For example, the major subportion is output with a primary tactile output profile that defines at least one of a first output duration and a first output intensity (e.g., long duration, strong intensity) per pulse while the minor subportion is output with a secondary tactile output profile defining at least one of a second output duration that is different the first output duration and a second output intensity that is different from the first output intensity per pulse. For instance, the second output duration is shorter than the first output duration, and the second output intensity is lower than (e.g., based on a peak amplitude or average amplitude of the tactile output) the first output intensity. It is further noted that if there are no major hour increments in the hour value (e.g., the hour value is less than a single major hour increment), then no pulses are output for the major subportion. Similarly, if there are no minor hour increments in the hour value (e.g., the hour value is the major hour increment or a multiple thereof), then no pulses are output for the minor subportion. As in previous examples, the device 600 can optionally output a pause or period of delay corresponding to zero values as a placeholder in outputting the time. It is noted that, in practice, representing the time in major and minor hour increments can optionally, in some cases, achieve brevity in output duration (e.g., conserve time and battery power) while still retaining accuracy of the output. Merely by way of example, if a current hour value is 6 (e.g., 6 PM or 6 AM), the hour-portion is output with a single long and/or strong pulse representing a major subportion where a major hour increment is the 5-hour increment, followed by a single short and/or light pulse representing the remaining 1-hour increment. This differs from other output methods, for example, which output a series of six long and/or strong pulses to indicate the hour value of 6.

In an example of a taptic style, a tactile output pattern includes an approximated time where the minute-portion is based on an approximated minutes value. For example, for a current or requested time, the device 600 determines a number of fractional increments based on the minute value of the current time, where each fractional increment of an hour is greater than one minute (e.g., 15-minute increments). In this case, the minute-portion is output as a single sequence (e.g., without subportions) of pulses, where a number of pulses being output by the tactile output generator corresponds to the determined number of fractional increments based on the approximated minutes in the current time. Merely by way of example, for a current time at 12:35, the actual minute value is 35 while an approximated minute value based on a 15-minute increment is 30. In that example, two pulses are output with each pulse representing a 15-minute increment. In some examples a minute value is less than the fractional increment of an hour (e.g., minute values under 15), no pulses are output in the minute-portion since a number of fractional increments is zero.

In an example of a taptic style, a tactile output pattern indicates a current time in Morse code format, further where the Morse code format represents an approximated current time or an exact current time. Merely by way of example, a current time corresponding to 1:00 AM is represented by a tactile output pattern that indicates "1" in Morse code (e.g., dot-dash-dash-dash-dash represents 1), or is represented by a tactile output pattern that indicates "1 AM" in Morse code (e.g., dot-dash-dash-dash-dash for 1, dot-dash for "A", dash-dash for "M"), where a dot represents a short pulse duration and a dash represents a long pulse duration. In another example, with 12-hour time format, "1 PM" is output with a tactile output pattern that indicates the same "1" in Morse code (e.g., dot-dash-dash-dash-dash represents 1), or is represented by a tactile output pattern that indicates "1 PM" in Morse code (e.g., dot-dash-dash-dash-dash for 1, dot-dash-dash-dot for "P", dash-dash for "M"). In yet another example, with 24-hour time format, "1" is output with a tactile output pattern that indicates the same "1" as above in Morse code (e.g., dot-dash-dash-dash-dash represents 1), while "13" corresponding to 1 PM is represented with, dot-dash-dash-dash-dash for "1", followed by, dot-dot-dot-dash-dash for "3".

Figure 6F:
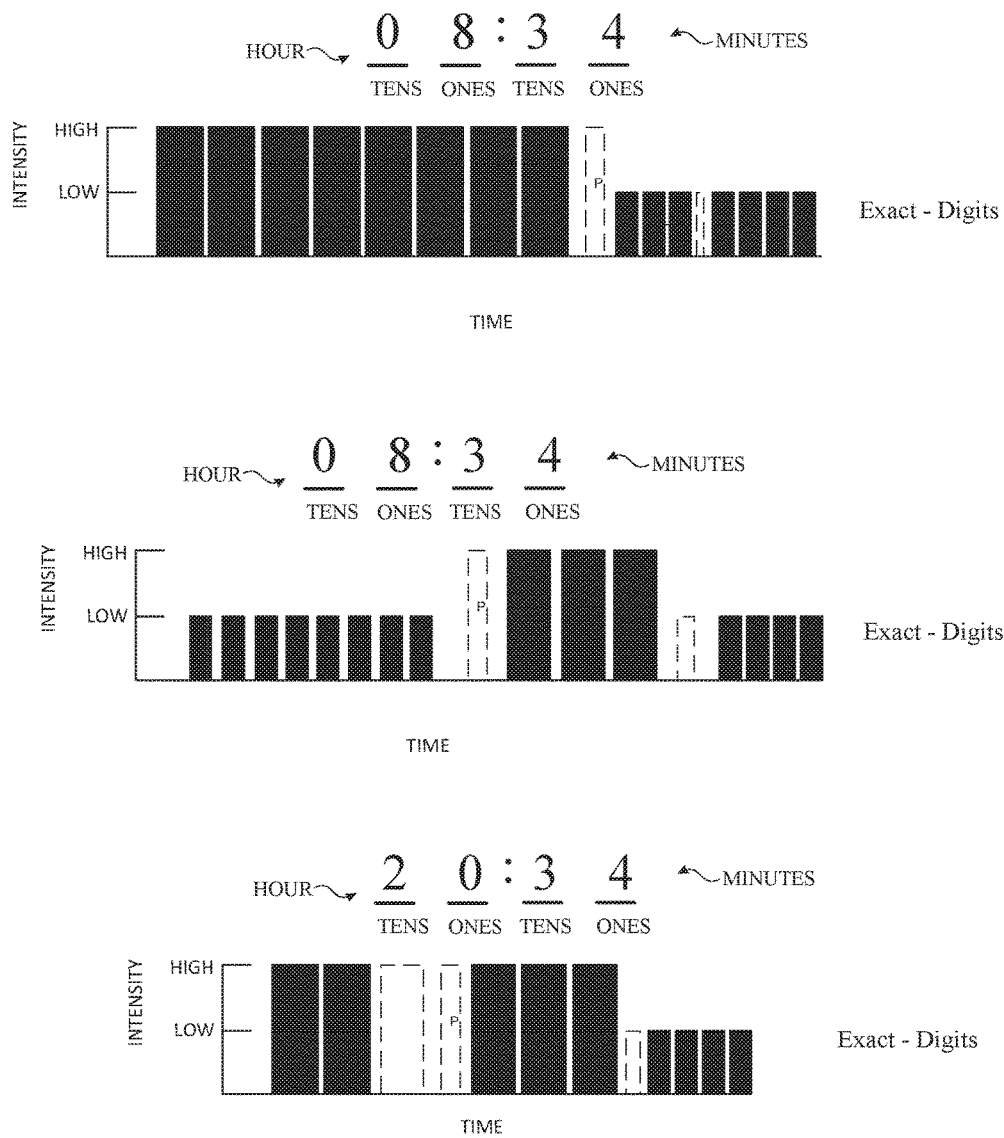
FIGS. 6F-6I illustrate example tactile output patterns, in accordance with various embodiments of the present invention.

Turning now to FIGS. 6F-6I, example tactile output patterns are shown according to various embodiments described above. FIG. 6F illustrates an example haptic output pattern for an exact, digits-type taptic style when a current time is 8:34, which corresponds to 8:34 AM, 8:34 PM, or 8:34 in 24-hour time format. In this example, the hours portion corresponding to "08" is represented by a sequence of eight pulses, where each pulse is output at a first output profile of long and strong pulse. After output of the hours portion, a pause (e.g., "P") indicates an end of the hours portion and a beginning of a minutes portion. Here, the minutes portion corresponds to "34" and is represented by a tens sequence and a ones sequence, where the tens sequence is represented by three pulses, a brief pause indicating a start of a ones sequence, and a ones sequence represented by four pulses. Here, any pulses corresponding to the minutes portion are output at a second output profile of short and light pulses. It is noted that the leading zero-value in the tens place is not represented by any tactile output. In some examples, a different tactile output pattern illustrates the same current time of 8:34. In this example, the hours portion corresponding to "08" is represented by a sequence of eight pulses, where each pulse is output at a first output profile of short and light pulses since the "8" corresponds to the ones value, where ones values are represented with a vibration profile that is short duration and low or light inpulse. After output of the hours portion, a pause (e.g., "P") can optionally indicate an end of the hours portion and a beginning of a minutes portion. Here, the minutes portion corresponds again to "34", but is now represented by a tens place subportion and a ones place subportion, where three long duration and strong intensity pulses indicate the "3" value in the tens place, an optional pause indicates the beginning of the ones place subportion, and the ones place subportion is represented by four short and light intensity pulses indicating the "4" value in the ones place. As demonstrated in this example, the ones place subportion and the tens place subportion, whether associated with the hours value or the minutes value of the current time, are output at two different vibrational profiles.

In a further example at FIG. 6F, a current time is 20:34, which corresponds to 8:34 PM in 12-hour time format. In this example, the hours portion corresponding to "20" is represented by a sequence of two pulses, where each pulse is output at a first output profile of a long and strong pulse, followed by an optional pause that can optionally have the same duration as the duration of the pulse in the first output profile. A second pause (e.g., "P") can optionally indicate an end of the hours portion output and/or a beginning of a minutes portion. Here, the minutes portion corresponds to "34" and is represented by a tens sequence and a ones sequence, where the tens sequence is represented by three pulses, a brief pause indicating a start of a ones sequence, and a ones sequence represented by four pulses. Here, any pulses corresponding to the minutes portion are output at a second output profile of short and light pulses. It is noted that the leading zero-value in the tens place is not represented by any tactile output. In some examples, any leading zero-value is not represented by any tactile output unless followed by another zero (e.g., "00"), in which a unique tactile output can be generated to inform a user of the minutes portion or the hours portion being "00". In some examples, the unique tactile output is a single long, steady pulse.

Figure 6G:
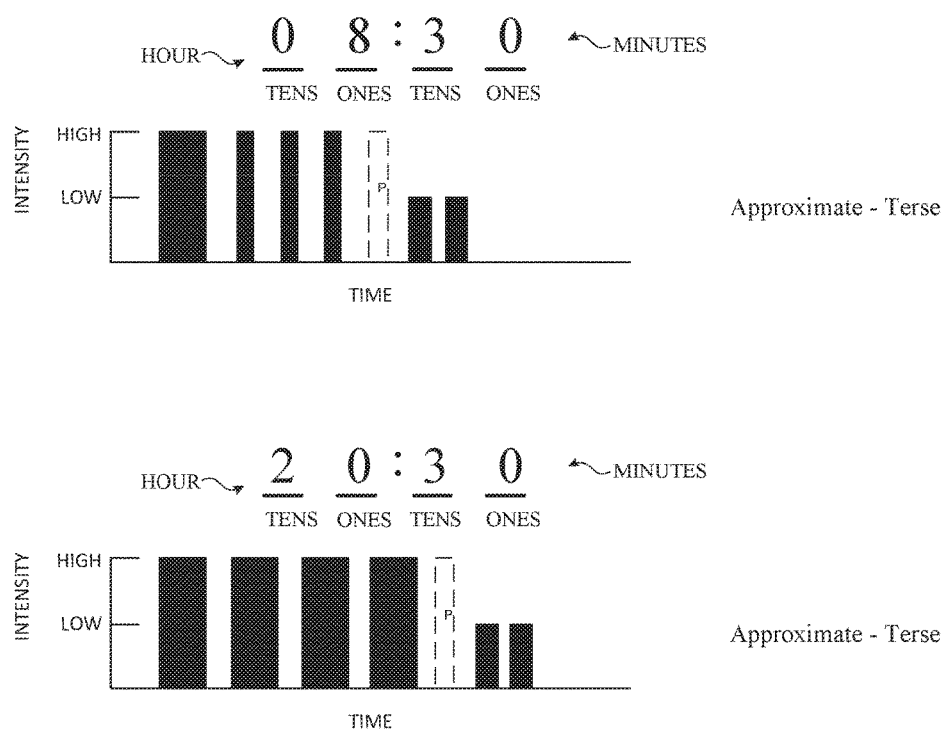

Turning now to FIG. 6G, an example tactile output pattern for an approximated, terse-type taptic style when a current time is 8:30 is demonstrated, which corresponds to 8:30 AM, 8:30 PM, or 8:30 in 24-hour time format. In this example, the approximated time output mode is based on a 15-minute fractional increment of an hour, 5-hour major increments, and 1-hour minor increments. Accordingly, the hour portion is output with a first pulse at a first vibrational profile (e.g., long, strong intensity) representing one 5-hour major increment, followed by three pulses each at a second vibrational profile (e.g., short, strong intensity) representing three 1-hour minor increments. After output of the hours portion, a pause (e.g., "P") can optionally indicate an end of the hours portion and a beginning of a minutes portion. Here, the minutes portion corresponds to "30" and is represented by two pulses that are each output at a third vibrational profile (e.g., short, light intensity) representing two 15-minute fractional increments. As further shown in FIG. 6G, a current time at 20:30 is demonstrated in the approximated, terse-type taptic style. Here, the hours portion for "20" is represented by four pulses at a first vibrational frequency (e.g., long, strong intensity), where each pulse represents one 5-hour increment.

Figure 6H:
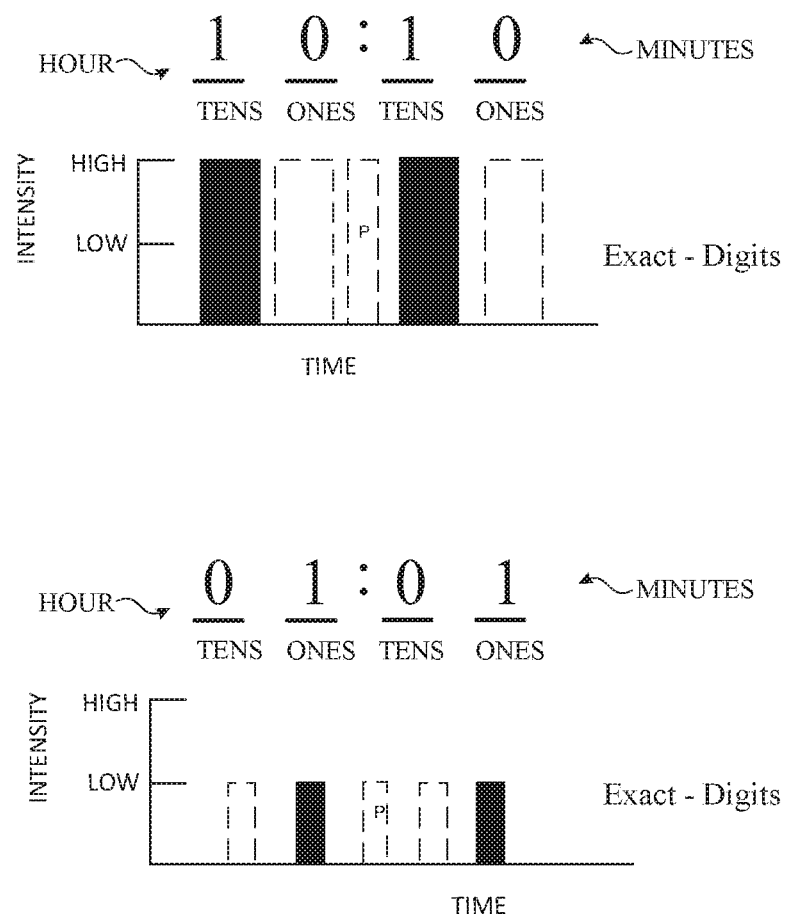

Turning now to FIG. 6H, an example tactile output pattern for an exact, digits-type taptic style when a current time is 10:10 is demonstrated. In this example, the hour portion is output with a first pulse at a first vibrational profile (e.g., long, strong intensity) representing the one value in the tens place, followed by an optional pause of a same duration to represent a zero value in the ones place. In this example, the tactile output pattern is repeated for the minutes portion. In another example shown in FIG. 6H, when a current time is 01:01, the one value in the ones place of both the hour portion and the minute portion is output at a pulse having a short, low intensity profile due to its ones position. Two pauses can optionally occur between the two pulses, where one pause indicates an end of the hours portion and the subsequent pause indicates the zero value of the tens place as a placeholder.

Figure 6I:
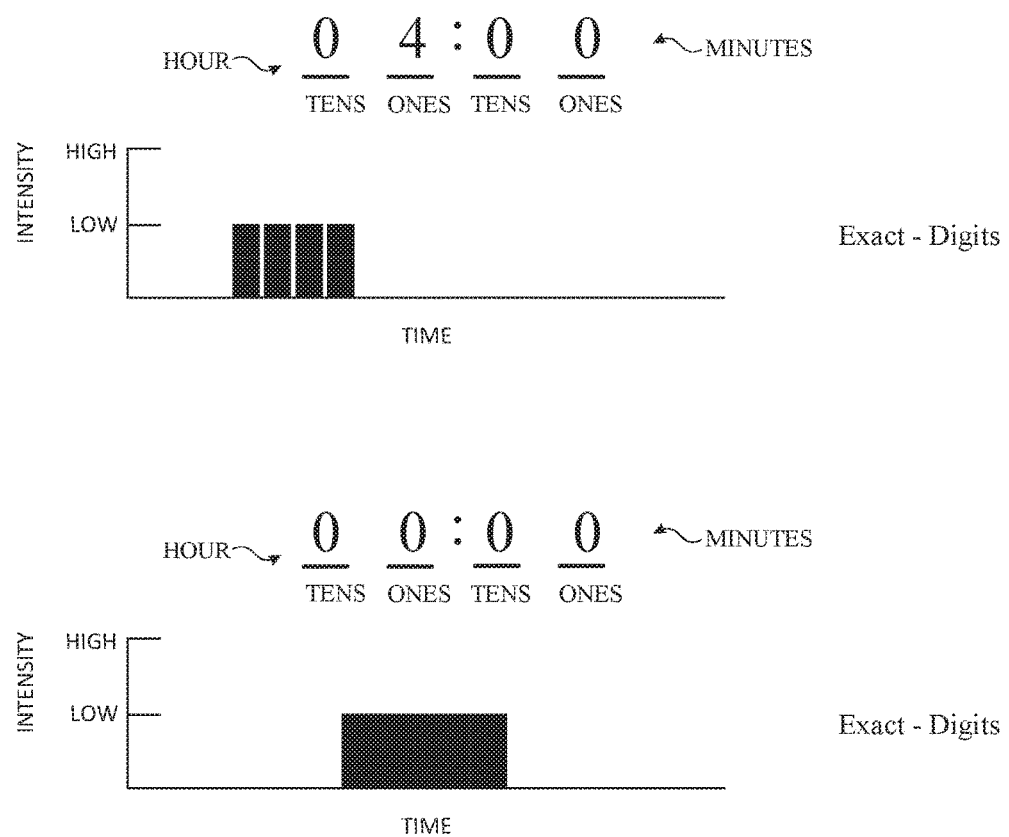

Turning now to FIG. 6I, an example of a tactile output pattern for an exact, digits-type taptic style is demonstrated. Here, a current time is 4:00 and is represented by four pulses defined by a same vibrational profile (e.g., short, light intensity due to the occupation of the 4 in the ones place). Here, all zero value digits do not have any haptic output associated therewith. In one example, a second vibrational profile comprising a long, light intensity, or otherwise, represents the minutes portion of "00". In that case, the four pulses are distinguished from four pulses corresponding to 0:04, or 0:40. In yet a further example as shown in FIG. 6I, a midnight time of 00:00 is shown as having a corresponding tactile output pattern that is unique from other zero-value outputs. Here, a long, light duration of a pulse can indicate that all values correspond to zero. In some examples, two pulses at the long, light intensity may be output, where each of the two pulses indicates "00". In some examples, no tactile sensation is output when all values correspond to zero.

FIG. 7 is a flow diagram illustrating a method 700 for tactile time feedback using an electronic device in accordance with some embodiments. Method 700 is performed at a device (e.g., 100, 300, 500, 600) with a touch-sensitive surface, a tactile output generator, and optionally a display screen. Some operations in method 700 are, optionally, combined, the order of some operations are, optionally, changed, and some operations are, optionally, omitted.

As shown in the method 700, the device (e.g., device 600) detects (e.g., at 702) a sequence of touch inputs (e.g., touch input 624) on the touch-sensitive surface (e.g., touch-sensitive surface 602).

In some embodiments, the device (e.g., device 600) further includes a display screen (e.g., touch-sensitive surface 602) and the sequence of touch inputs (e.g., touch input 650) includes a first tap (e.g., tap 1 at FIG. 6B) and a second tap (e.g., tap 2 at FIG. 6B). In response to detecting the first tap, the device (e.g., device 600) turns on the display screen (e.g., touch-sensitive surface 602).

In some embodiments, in response to detecting the sequence of touch inputs (e.g., touch input 624) on the touch-sensitive surface (e.g., touch-sensitive surface 602), the device (e.g., device 600) determines if the sequence of touch inputs (e.g., touch input 624) meet the tactile time output criteria.

In response to detecting the sequence of touch inputs (e.g., touch input 624) on the touch-sensitive surface (e.g., touch-sensitive surface 602), the device (e.g., device 600), in accordance with a determination that the sequence of touch inputs (e.g., touch input 624) detected on the touch-sensitive surface meets a tactile time output criteria and a current time of day is a first time, where the tactile time output criteria includes a criterion that is met when a predetermined number of taps are detected on the touch-sensitive surface (e.g., touch-sensitive surface 602) within a predetermined time threshold, outputs (e.g., at 704), by the tactile output generator (e.g., tactile output generator 167), a first tactile output pattern (e.g., pulses 626) that is indicative of the first time (e.g., FIG. 6D).

In some embodiments, the touch-sensitive surface (e.g., touch-sensitive surface 602) is a touch-sensitive display screen and the tactile time output criteria includes a criterion that is met when the sequence of touch inputs (e.g., touch input 624) is detected on the touch-sensitive display screen (e.g., touch-sensitive surface 602) while the touch-sensitive display screen is off (e.g., display off state 610 at FIG. 6A).

In some embodiments, the tactile output criteria includes a criterion that is met when an accessibility mode at the electronic device (e.g., device 600) is enabled (e.g., FIG. 6C). For example, FIG. 6C shows that taptic time is enabled, manually, by the user. FIG. 6C shows various taptic styles (e.g., digits, terse, Morse code) styles selectable by the user. The device generates, by the taptic output generator 167, taptic output patterns in accordance with the style selected from the accessibility mode window shown at FIG. 6C. The accessibility mode shown at FIG. 6C permits the user to toggle off the taptic time capability. This permits the user to choose when taptic time is desired for output.

In some embodiments, the tactile output criteria includes a criterion that is met when the sequence of touch inputs (e.g. touch input 604) is detected after a predetermined threshold amount of time has elapsed during which no notification that was not a tactile time output was generated by the device. For example, FIG. 6A demonstrates the device 600 in the display off state 610, during which the device 600 is asleep and not generating notifications or outputs.

In some embodiments, the tactile output criteria includes a criterion that is met when the sequence of touch inputs (e.g., touch input 604) is detected after a predetermined threshold of time has elapsed during which the device (e.g., device 600) did not detect user input that was not a sequence of touch inputs (e.g., touch input 604) for outputting a tactile output pattern. As discussed above, the device is in an inactive state where no user interaction with the device is detected. As shown in at least FIG. 6A, the display is off in the display off state 610 and the device is asleep. However, the user can request multiple tactile outputs directed to outputting time. In some examples, the display screen stays off while multiple touch inputs 604 are detected for multiple times.

In some embodiments, the first tactile output pattern is indicative of the first time and provides an indication of the first time in a 12-hour time format (e.g., FIG. 6F-6I).

In some embodiments, the first tactile output pattern is indicative of the first time and provides an indication of the first time in a 24-hour time format (e.g., FIG. 6F-6I).

In some embodiments, the first tactile output pattern that is indicative of the first time and provides an indication of the first time in a Morse code format. A benefit of providing the tactile output pattern in Morse code is that Morse code is a standard, universal code that does not require unique instructions for understanding by human or machine.

In some embodiments, the first tactile output pattern includes a first portion and a second portion distinct from the first portion in at least one of an output duration and an output intensity (e.g., FIG. 6F-6I).

In some embodiments, the first tactile output pattern includes an hour-portion determined based on an hour value of the first time and a minute-portion determined based on a minute value of the first time (e.g., FIG. 6F-6I). The hour portion and the minute portion are separable by a pause that indicates when the hour portion ends and when the minute portion begins. The tactile output pattern includes both hours and minutes so that, merely by way of example, the device does not need to receive additional requests to output additional portions of the current time. For example, the device does not need to receive or distinguish a separate input that requests the minutes, since the minutes have already been outputted.

In some embodiments, the hour-portion and the minute-portion are separated by a predetermined period of time during which no tactile output is generated by the device (e.g., FIG. 6F-6I). For instance, this enables the hour portion and the minutes portion to be outputted one after another without causing misinterpretation or confusion for the user and without requiring additional indication to be generated by the device to relay such indication. The predetermined period of time is a brief pause that indicates to the user that the remaining tactile sensations are directed to the hours is directed to minutes.

In some embodiments, the hour-portion includes a tens place subportion and a ones place subportion. Each of the tens place subportion and the ones place subportion is determined based on a respective value of the hour value of the first time. Outputting the hour-portion includes outputting the tens place subportion comprising a number of pulses corresponding to a value in a tens place of the hour value and the ones place subportion comprising a number of pulses corresponding to a value in a ones place of the hour value. The tens place subportion is output before the ones place subportion is output (e.g., FIG. 6F, 6H, 6I).

In some embodiments, the device outputs the tens place subportion with a primary vibration profile defining at least one of a long output duration and a strong output intensity per pulse, and the ones place subportion with a secondary vibration profile defining at least one of a short output duration and a low output intensity per pulse (e.g., FIG. 6F, 6H, 6I). In this way, the device outputs the tens place value and ones place value consecutively without confounding the outputs since the pulses are defined by the different vibrational profiles. This effectively communicates the time to a user without requiring additional output of the time, such as audio or visual feedback.

In some embodiments, the device forgoes outputting the tens place subportion when the value in the tens place is zero, and forgoes outputting the ones place subportion when the value in the ones place is zero (e.g., FIG. 6F, 6H, 6I). In some cases, the device outputs a pause when a value is zero. The pause is optionally maintained for a duration corresponding to a duration of a pulse for the tens place or the ones place.

In some embodiments, the hour-portion includes a major subportion and a minor subportion. The major subportion is determined based on a number of major hour increments in the hour value and the minor subportion is determined based on a number of minor hour increments in the hour value remaining after the major hour increments are determined. Each major hour increment is greater than one hour and greater than each minor hour increment. Outputting the hour-portion includes outputting the major subportion comprising a number of pulses corresponding to a number of major hour increments of the hour value, and the minor subportion comprising a number of pulses corresponding to a number of minor hour increments of the hour value after the major hour increments are determined. The major subportion is output before the minor subportion is output (e.g., FIG. 6G). The device can optionally output the time more efficiently by outputting the abbreviated time by way of the major hour increments and the minor hour increments. In some cases, abbreviated output saves device power and resources since the device generates fewer outputs than required for a nonabbreviated time.

In some embodiments, the device outputs the major subportion with a primary tactile output profile defining at least one of a first output duration and a first output intensity, and the minor subportion with a secondary tactile output profile defining at least one of a second output duration that is different the first output duration and a second output intensity that is different from the first output intensity (e.g., FIG. 6G).

In some embodiments, the device forgoes outputting the major subportion when the number of major hour increments in the hour value is zero, and forgoes outputting the minor subportion when the number of minor hour increments in the hour value is zero (e.g., FIG. 6G).

In some embodiments, the major hour increments are 5-hour increments and the minor hour increments are 1-hour increments (e.g., FIG. 6G).

In some embodiments, the minute-portion includes a tens place subportion and a ones place subportion, the tens place subportion and the ones place subportion are both determined based on a same respective value of the minute value of the first time, and outputting the minute-portion includes outputting the tens place subportion comprising a number of pulses corresponding to a value in a tens place of the minute value, and the ones place subportion comprising a number of pulses corresponding to a value in a ones place of the minute value. The tens place subportion is output before the ones place subportion is output (e.g., FIG. 6F, 6H, 6I).

In some embodiments, the device (e.g., device 600) outputs the tens place subportion with a primary tactile output profile defining at least one of a first output duration and a first output intensity, and the ones place subportion with a secondary tactile output profile defining at least one of a second output duration that is different from the first output duration and a second output intensity that is different from the first output intensity (e.g., FIG. 6F, 6H, 6I). In this way, the device outputs the tens place value and ones place value consecutively without confounding the outputs since the pulses are defined by the different vibrational profiles. This effectively communicates the time to a user without requiring additional output of the time, such as audio or visual feedback.

In some embodiments, the device (e.g., device 600) forgoes outputting the tens place subportion when the value in the tens place is zero, and forgoes outputting the ones place subportion when the value in the ones place is zero (e.g., FIG. 6F, 6H, 6I). In some cases, the device outputs a pause when a value is zero. The pause is optionally maintained for a duration corresponding to a duration of a pulse for the tens place or the ones place.

In some embodiments, the device (e.g., device 600) determines a number of fractional increments based on the minute value of the first time, where each fractional increment of an hour is greater than one minute, and outputs the minute-portion with a number of pulses corresponding to the determined number of fractional increments (e.g., FIG. 6G). For example, the device 600 outputs time in 15 minute intervals by rounding the current time down to the nearest 15-minute interval (e.g., 00, 15, 30, 45). In this way, the device outputs a number of intervals captured in the current minutes and the output is simplified. For example, the device 600 simply outputs one tap per 15 minute interval. In that case, a maximum amount of taps required to represent the minutes value is 3 taps corresponding to 45 minutes past the hour. In that case, the tactile output generator 167 need only output a maximum of three taps for the minutes value and its operations can optionally be reduced and simplified. It is contemplated that the approximated time output mode reduces cognitive burden, is quick and efficient, and reduces an amount of time required to ascertain the time. It is also contemplated that the approximated time output mode conserves battery power due to less tactile output required to represent the time, since only one, two, or three taps are required to indicate the minutes.

In some embodiments, the fractional increments are 15-minute increments (e.g., FIG. 6G).

In some embodiments, the device (e.g., device 600) forgoes outputting the minute-portion when the number of pulses corresponding to the determined number of fractional increments is zero (e.g., FIG. 6G).

In accordance with a determination that the sequence of touch inputs (e.g., touch input 628) detected on the touch-sensitive surface (e.g., touch-sensitive surface 602) meets the tactile time output criteria and the current time of day is a second time, the device (e.g., device 600) outputs (e.g., at 706), by the tactile output generator (e.g., tactile output generator 167), a second tactile output pattern (e.g., pulses 630) that is indicative of the second time, where the first tactile output pattern and the second tactile output pattern are different (e.g., FIG. 6D). In some examples, the tactile output generator 167 outputs a new tactile output pattern, such as the second tactile output pattern, in accordance with the device 600 determining that the time has changed to a new time that is different from the previously-requested time. In some examples, the tactile output generator 167 outputs a different tactile output pattern based on a different taptic style or time format (e.g., between 12-hour time format and 24-hour time format).

In some embodiments, at a second time, the device (e.g., device 600) detects a subsequent sequence of touch inputs (e.g., touch input 646). In response to detecting the subsequent sequence of touch inputs (e.g., touch input 646) on the touch-sensitive surface (e.g., touch-sensitive surface 602) and in accordance with a determination that the subsequent sequence of touch inputs (e.g., touch input 646) detected on the touch-sensitive surface (e.g., touch-sensitive surface 602) meets the tactile time output criteria and the current time of day is a third time, the device (e.g., 600) outputs, by the tactile output generator (e.g., tactile output generator 167), a third tactile output pattern (e.g., pulses 648) that is indicative of the third time. The third tactile output pattern (e.g., pulses 648) is the same as the second tactile output pattern (e.g., pulses 644). The third time is different than the second time and the third time differs from the second time by less than a predetermined amount of time (e.g., FIG. 6E for approximated time). As shown in at least FIG. 6E, taptic feedback indication includes an approximated time mode in which the minutes portion of the current time is rounded up or down to a nearest increment, such as to a nearest fractional increment of an hour. For example, the device 600 outputs time in 15 minute intervals by rounding an actual, current time down to the nearest 15-minute interval (e.g., 00, 15, 30, 45). In this way, the tactile output of the device 600 is optionally simplified. For example, the device 600 simply outputs one tap per 15 minute interval. In that case, a maximum amount of taps required to represent the minutes value is 3 taps corresponding to 45 minutes past the hour. In that case, the tactile output generator 167 need only output a maximum of three taps for the minutes value and its operations can optionally be reduced and simplified. It is contemplated that the approximated time output mode reduces cognitive burden, is quick and efficient, and reduces an amount of time required to ascertain the time. It is also contemplated that the approximated time output mode conserves battery power due to less tactile output required to represent the time, since only one, two, or three taps are required to indicate the minutes.

In some embodiments, in accordance with a determination that the sequence of touch inputs (e.g., touch input 650) detected on the touch-sensitive surface (e.g., touch-sensitive surface 602) meets the tactile time output criteria and the current time of day is a fourth time, the device outputs, by the tactile output generator (e.g., tactile output generator 167), a fourth tactile output pattern (e.g., pulses 652) that is indicative of the fourth time. The fourth tactile output pattern is the different from the first tactile output pattern, the second tactile output pattern, and the third tactile output pattern. The fourth time is different than the second time and the third time differs from the second time by more than the predetermined amount of time. For example, the third time differs from the second time by more than a single fractional increment of an hour that is used in outputting approximate time. As discussed above, the single fractional increment of an hour can be 15 minutes. By outputting the new tactile output pattern, the device 600 indicates that the time has changed by more than the fractional increment of the hour. In this way, the device 600 provides indication for a new time while still being conservative in the number of outputs required to indicate the new time. Therefore, the new time is indicated without significant additional resources required.

In accordance with a determination that the sequence of touch inputs (e.g., touch input 628) detected on the touch-sensitive surface (e.g., touch-sensitive surface 602) does not meet the tactile time output criteria, the device (e.g., device 600) forgoes (e.g., at 708) outputting a tactile output pattern that is indicative of the current time of day (e.g., FIG. 6D).

In some embodiments, in accordance with a determination that the sequence of touch inputs (e.g., touch input 604) detected on the touch-sensitive surface (e.g., touch-sensitive surface 602) does not meet the tactile time output criteria, the device performs a function at the device (e.g., device 600) other than outputting a tactile output pattern that is indicative of the current time of day (e.g., FIG. 6A). For example, at FIG. 6A, the touch input 604 is received at a location corresponding to a maps affordance 608-1 while the display screen is on. Therefore, the touch-input 604 does not meet the criterion for the display being off and instead the device 600 launches the navigation application 608-2 which corresponds to the selected maps affordance 608-1.

In some embodiments, the sequence of touch inputs (e.g., touch input 604) includes a tap. In accordance with a determination that the sequence of touch inputs (e.g., touch input 604) detected on the touch-sensitive surface (e.g., touch-sensitive surface 602) does not meet the tactile time output criteria, the device (e.g., device 600) activates a function that corresponds to a location of the tap (e.g., FIG. 6A). As shown at FIG. 6A, the activated function is the launching of the maps application 608-2 that corresponds to the maps affordance 608-1, which corresponds to the location of the tap on the touch-sensitive surface 602.

In some embodiments, the touch-sensitive surface (e.g., touch-sensitive surface 602) is a touch-sensitive display screen and activating the function includes launching an application associated with an affordance (e.g., maps affordance 608-1) located on the touch-sensitive display screen (e.g., touch-sensitive surface 602) at the location of the tap (e.g., FIG. 6A).

Figure 8:
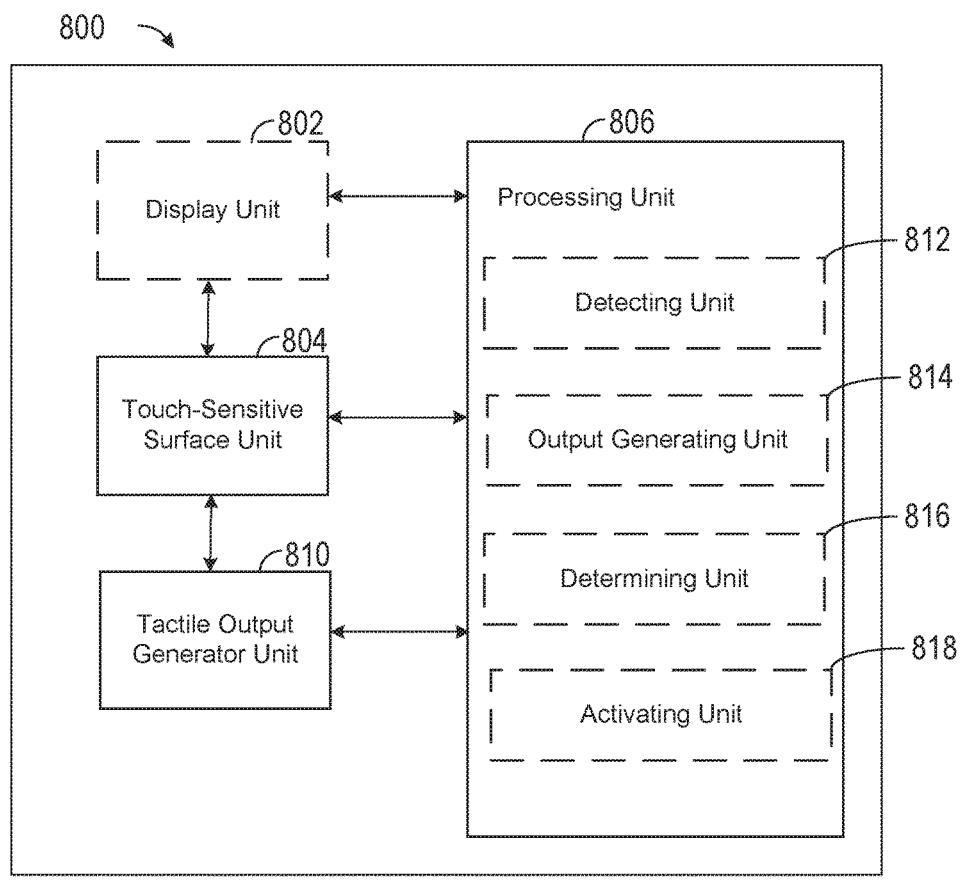
FIG. 8 is a functional block diagram of an electronic device, in accordance with various embodiments of the present invention.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes, optionally, a display unit 802 configured to display a graphic user interface, a touch-sensitive surface unit 804 configured to receive contacts, a processing unit 806 coupled to the display unit 802 and, optionally, the touch-sensitive surface unit 804, and a tactile output generator unit 810 coupled to the processing unit 806 and the touch-sensitive surface unit. In some embodiments, the processing unit 806 includes a detecting unit 812, an output generating unit 814, a determining unit 816, and an activating unit 818.

The processing unit 806 is configured to detect (e.g., with detecting unit 812) a sequence of touch inputs on the touch-sensitive surface. In response to detecting the sequence of touch inputs on the touch-sensitive surface unit 804, the processing unit 806 is configured to, in accordance with a determination that the sequence of touch inputs detected on the touch-sensitive surface unit 804 meets a tactile time output criteria and a current time of day is a first time, where the tactile time output criteria includes a criterion that is met when a predetermined number of taps are detected on the touch-sensitive surface unit 804 within a predetermined time threshold, output (e.g., with output generating unit 814), by the tactile output generator unit 810, a first tactile output pattern that is indicative of the first time. The processing unit 806 is further configured to, in response to detecting the sequence of touch inputs on the touch-sensitive surface unit 804, in accordance with a determination that the sequence of touch inputs detected on the touch-sensitive surface unit 804 meets the tactile time output criteria and the current time of day is a second time, output (e.g., with output generating unit 814), by the tactile output generator unit, a second tactile output pattern that is indicative of the second time, where the first tactile output pattern and the second tactile output pattern are different. Further, the processing unit 806 is configured to, in response to detecting the sequence of touch inputs on the touch-sensitive surface unit 804, in accordance with a determination that the sequence of touch inputs detected on the touch-sensitive surface unit 804 does not meet the tactile time output criteria, forgo outputting a tactile output pattern that is indicative of the current time of day.

In some embodiments, the processing unit 806 is further configured to, in response to detecting the sequence of touch inputs on the touch-sensitive surface unit 804, determine (e.g., with determining unit 816) if the sequence of touch inputs meet the tactile time output criteria. The processing unit 806 may further be configured to detect, (e.g., with detecting unit 812) a subsequent sequence of touch inputs. In response to detecting the subsequent sequence of touch inputs on the touch-sensitive surface unit 804 and in accordance with a determination that the subsequent sequence of touch inputs detected on the touch-sensitive surface unit 804 meets the tactile time output criteria and the current time of day is a third time, the processing unit 806 may be configured to output (e.g., with output generating unit 814), by the tactile output generator unit 810, a third tactile output pattern that is indicative of the third time. The third tactile output pattern is the same as the second tactile output pattern. The third time is different than the second time and the third time differs from the second time by less than a predetermined amount of time.

In some embodiments, the processing unit 806 is further configured to, in accordance with a determination that the sequence of touch inputs detected on the touch-sensitive surface meets the tactile time output criteria and the current time of day is a fourth time, output (e.g., with output generating unit 814), by the tactile output generator unit 810, a fourth tactile output pattern that is indicative of the fourth time. The fourth tactile output pattern is the different from the first tactile output pattern, the second tactile output pattern, and the third tactile output pattern. The fourth time is different than the second time and the third time differs from the second time by more than the predetermined amount of time.

The touch-sensitive surface unit 804 may include a touch-sensitive display screen and the tactile time output criteria may include a criterion that is met when the sequence of touch inputs is detected (e.g., with detecting unit 812 at the processing unit 806) on the touch-sensitive display screen while the touch-sensitive display screen is off.

In some embodiments, the tactile output criteria includes a criterion that is met when an accessibility mode at the electronic device is enabled.

In some embodiments, the tactile output criteria includes a criterion that is met when the sequence of touch inputs is detected (e.g., with detecting unit 812) after a predetermined threshold amount of time has elapsed during which no notification that was not a tactile time output was generated (e.g., with output generating unit 814) by the device.

In some embodiments, the tactile output criteria includes a criterion that is met when the sequence of touch inputs is detected after a predetermined threshold of time has elapsed during which the device did not detect user input that was not a sequence of touch inputs for outputting a tactile output pattern.

In some embodiments, the processing unit 806 is configured to meet a criterion of the tactile output criteria when the sequence of touch inputs is detected (e.g., with detecting unit 812) after a predetermined threshold amount of time has elapsed during which no notification that was not a tactile time output was generated (e.g., with output generating unit 814) by the device.

In some embodiments, the processing unit 806 is configured to meet a criterion of the tactile output criteria when the sequence of touch inputs is detected (e.g., with detecting unit 812) after a predetermined threshold of time has elapsed during which the device did not detect (e.g., with detecting unit 812) user input that was not a sequence of touch inputs for outputting a tactile output pattern.

In some embodiments, the device further includes a display screen (e.g., display unit 802) and the sequence of touch inputs includes a first tap and a second tap. In response to detecting (e.g., with detecting unit 812) the first tap, the device turns on the display screen.

In some embodiments, in accordance with a determination that the sequence of touch inputs detected on the touch-sensitive surface does not meet the tactile time output criteria, the processing unit 806 is configured to perform a function at the device other than outputting (e.g., with output generating unit 814) a tactile output pattern that is indicative of the current time of day.

In some embodiments, the sequence of touch inputs includes a tap. In accordance with a determination that the sequence of touch inputs detected on the touch-sensitive surface does not meet the tactile time output criteria, the processing unit 806 is configured to activate (e.g., with activating unit 818) a function that corresponds to a location of the tap.

In some embodiments, the touch-sensitive surface unit is a touch-sensitive display screen and activating (e.g., with activating unit 818) the function includes launching (e.g., with activating unit 818) an application associated with an affordance located on the touch-sensitive display screen at the location of the tap.

In some embodiments, the first tactile output pattern (e.g., generated with output generating unit 814) is indicative of the first time and provides an indication of the first time in a 12-hour time format.

In some embodiments, the first tactile output pattern (e.g., generated with output generating unit 814) is indicative of the first time and provides an indication of the first time in a 24-hour time format.

In some embodiments, the first tactile output pattern (e.g., generated with output generating unit 814) that is indicative of the first time provides an indication of the first time in a Morse code format.

In some embodiments, the first tactile output pattern (e.g., generated with output generating unit 814) includes a first portion and a second portion distinct from the first portion in at least one of an output duration and an output intensity.

In some embodiments, the first tactile output pattern includes an hour-portion (e.g., generated with output generating unit 814) determined (e.g., with determining unit 816) based on an hour value of the first time and a minute-portion determined (e.g., with determining unit 816) based on a minute value of the first time.

In some embodiments, the hour-portion and the minute-portion are separated by a predetermined period of time during which no tactile output is generated (e.g., generated with output generating unit 814) by the device.

In some embodiments, the hour-portion includes a tens place subportion and a ones place subportion. Each of the tens place subportion and the ones place subportion is determined (e.g., with determining unit 816) based on a respective value of the hour value of the first time. Outputting (e.g., with output generating unit 814) the hour-portion includes outputting (e.g., with output generating unit 814) the tens place subportion comprising a number of pulses corresponding to a value in a tens place of the hour value and the ones place subportion comprising a number of pulses corresponding to a value in a ones place of the hour value. The tens place subportion is output (e.g., with output generating unit 814) before the ones place subportion is output.

In some embodiments, the processing unit 806 is configured to output (e.g., with output generating unit 814) the tens place subportion with a primary vibration profile defining at least one of a long output duration and a strong output intensity per pulse, and the ones place subportion with a secondary vibration profile defining at least one of a short output duration and a low output intensity per pulse.

In some embodiments, the processing unit 806 is configured to forgo outputting (e.g., with output generating unit 814) the tens place subportion when the value in the tens place is zero, and forgo outputting (e.g., with output generating unit 814) the ones place subportion when the value in the ones place is zero.

In some embodiments, the hour-portion includes a major subportion and a minor subportion. The major subportion is determined (e.g., with determining unit 816) based on a number of major hour increments in the hour value and the minor subportion is determined (e.g., with determining unit 816) based on a number of minor hour increments in the hour value remaining after the major hour increments are determined. Each major hour increment is greater than one hour and greater than each minor hour increment. Outputting (e.g., with output generating unit 814) the hour-portion includes outputting (e.g., with output generating unit 814) the major subportion comprising a number of pulses corresponding to a number of major hour increments of the hour value, and the minor subportion comprising a number of pulses corresponding to a number of minor hour increments of the hour value after the major hour increments are determined. The major subportion is output before the minor subportion is output.

In some embodiments, the processing unit 806 is configured to output (e.g., with output generating unit 814) the major subportion with a primary tactile output profile defining at least one of a first output duration and a first output intensity, and the minor subportion with a secondary tactile output profile defining at least one of a second output duration that is different the first output duration and a second output intensity that is different from the first output intensity.

In some embodiments, the processing unit 806 is configured to forgo outputting (e.g., with output generating unit 814) the major subportion when the number of major hour increments in the hour value is zero, and forgo outputting (e.g., with output generating unit 814) the minor subportion when the number of minor hour increments in the hour value is zero.

In some embodiments, the major hour increments are 5-hour increments and the minor hour increments are 1-hour increments.

In some embodiments, the minute-portion includes a tens place subportion and a ones place subportion, the tens place subportion and the ones place subportion are both determined (e.g., with determining unit 816) based on a same respective value of the minute value of the first time, and outputting (e.g., with output generating unit 814) the minute-portion includes outputting (e.g., with output generating unit 814) the tens place subportion comprising a number of pulses corresponding to a value in a tens place of the minute value, and the ones place subportion comprising a number of pulses corresponding to a value in a ones place of the minute value. The tens place subportion is output (e.g., with output generating unit 814) before the ones place subportion is output.

In some embodiments, the processing unit 806 outputs (e.g., with output generating unit 814) the tens place subportion with a primary tactile output profile defining at least one of a first output duration and a first output intensity, and the ones place subportion with a secondary tactile output profile defining at least one of a second output duration that is different from the first output duration and a second output intensity that is different from the first output intensity.

In some embodiments, the processing unit 806 is configured to forgo outputting (e.g., with output generating unit 814) the tens place subportion when the value in the tens place is zero, and forgo outputting (e.g., with output generating unit 814) the ones place subportion when the value in the ones place is zero.

In some embodiments, the processing unit 806 is configured to determine (e.g., with determining unit 816) a number of fractional increments based on the minute value of the first time, where each fractional increment of an hour is greater than one minute, and output (e.g., with output generating unit 814) the minute-portion with a number of pulses corresponding to the determined number of fractional increments.

In some embodiments, the fractional increments are 15-minute increments.

In some embodiments, the processing unit 806 is configured to forgo outputting (e.g., with output generating unit 814) the minute-portion when the number of pulses corresponding to the determined number of fractional increments is zero.

The operations described above with reference to FIG. 7 are, optionally, implemented by components depicted in FIGS. 1A-1B or FIG. 8. For example, detecting operation 702, outputting-related operations 704, 706, 708 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
  a tactile output generator;
  a touch-sensitive display screen;
  one or more processors;
  a memory; and
  one or more programs, wherein the one or more programs are stored in the memory and configured to be executed by the one or more processors, the one or more programs including instructions for:
    detecting a sequence of touch inputs that includes at least a first touch input and a second touch input on the touch-sensitive display screen;
    in response to detecting the sequence of touch inputs on the touch-sensitive display screen:
      in accordance with a determination that the sequence of touch inputs detected on the touch-sensitive display screen meets a tactile time output criteria and a current time of day is a first time, wherein the tactile time output criteria includes a criterion that is met when the first touch input and the second touch input are detected on the touch-sensitive display screen within a predetermined time threshold while the state of the touch-sensitive display screen is in an off state, outputting, by the tactile output generator, a first tactile output pattern that is indicative of the first time;
      in accordance with a determination that the sequence of touch inputs detected on the touch-sensitive display screen meets the tactile time output criteria and the current time of day is a second time, outputting, by the tactile output generator, a second tactile output pattern that is indicative of the second time, wherein the first tactile output pattern and the second tactile output pattern are different; and in accordance with a determination that the sequence of touch inputs detected on the touch-sensitive display screen is detected while the state of the touch-sensitive display screen is in an on state:
forgoing output of a tactile output pattern that is indicative of the current time of day; and
performing a function at the electronic device other than outputting a tactile output pattern that is indicative of the current time of day.

2. The electronic device of claim 1, wherein the tactile time output criteria includes a criterion that is met when an accessibility mode at the electronic device is enabled.

3. The electronic device of claim 1, wherein the electronic device further includes a display screen and the sequence of touch inputs includes a first tap and a second tap, the one or more programs further including instructions for:
in response to detecting the first tap, turning on the display screen.

4. The electronic device of claim 1, the one or more programs further including instructions for:
in accordance with a determination that the sequence of touch inputs detected on the touch-sensitive display screen does not meet the tactile time output criteria, performing a function at the electronic device other than outputting a tactile output pattern that is indicative of the current time of day.

5. The electronic device of claim 1, wherein the sequence of touch inputs includes a tap, the one or more programs further including instructions for:
in accordance with a determination that the sequence of touch inputs detected on the touch-sensitive display screen does not meet the tactile time output criteria, activating a function that corresponds to a location of the tap.

6. The electronic device of claim 5, wherein activating the function includes launching an application associated with an affordance located on the touch-sensitive display screen at the location of the tap.

7. The electronic device of claim 1, wherein the first tactile output pattern that is indicative of the first time provides an indication of the first time in a Morse code format.

8. The electronic device of claim 1, wherein the first tactile output pattern includes a first portion and a second portion distinct from the first portion in at least one of an output duration or an output intensity.

9. The electronic device of claim 1, wherein the first tactile output pattern includes an hour-portion determined based on an hour value of the first time and a minute-portion determined based on a minute value of the first time.

10. The electronic device of claim 9, wherein the hour-portion and the minute-portion are separated by a predetermined period of time during which no tactile output is generated by the device.

11. The electronic device of claim 9, wherein:
the hour-portion includes a tens place subportion and a ones place subportion;
each of the tens place subportion and the ones place subportion is determined based on a respective value of the hour value of the first time; the outputting of the hour-portion includes outputting:
the tens place subportion comprising a number of pulses corresponding to a value in a tens place of the hour value, and
the ones place subportion comprising a number of pulses corresponding to a value in a ones place of the hour value; and the tens place subportion is output before the ones place subportion is output.

12. The electronic device of claim 11, the one or more programs further including instructions for:
outputting the tens place subportion with a primary vibration profile defining at least one of a long output duration or a strong output intensity per pulse; and
outputting the ones place subportion with a secondary vibration profile defining at least one of a short output duration or a low output intensity per pulse.

13. The electronic device of claim 11, wherein:
the hour-portion includes a major subportion and a minor subportion;
the major subportion is determined based on a number of major hour increments in the hour value and the minor subportion is determined based on a number of minor hour increments in the hour value remaining after the major hour increments are determined;
each major hour increment is greater than one hour and greater than each minor hour increment;
the outputting of the hour-portion includes outputting:
the major subportion comprising a number of pulses corresponding to a number of major hour increments of the hour value, and
the minor subportion comprising a number of pulses corresponding to a number of minor hour increments of the hour value after the major hour increments are determined; and
the major subportion is output before the minor subportion is output.

14. The electronic device of claim 13, the one or more programs further comprising instructions for:
outputting the major subportion with a primary tactile output profile defining at least one of a first output duration or a first output intensity; and
outputting the minor subportion with a secondary tactile output profile defining at least one of a second output duration that is different the first output duration or a second output intensity that is different from the first output intensity.

15. The electronic device of claim 9, wherein:
the minute-portion includes a tens place subportion and a ones place subportion;
the tens place subportion and the ones place subportion are both determined based on a same respective value of the minute value of the first time;
the outputting of the minute-portion includes outputting:
the tens place subportion comprising a number of pulses corresponding to a value in a tens place of the minute value, and
the ones place subportion comprising a number of pulses corresponding to a value in a ones place of the minute value; and
the tens place subportion is output before the ones place subportion is output.

16. The electronic device of claim 15, the one or more programs further comprising instructions for:
outputting the tens place subportion with a primary tactile output profile defining at least one of a first output duration or a first output intensity; and
outputting the ones place subportion with a secondary tactile output profile defining at least one of a second output duration that is different from the first output duration or a second output intensity that is different from the first output intensity.

17. The electronic device of claim 15, the one or more programs further comprising instructions for:

determining a number of fractional increments based on the minute value of the first time, wherein each fractional increment of an hour is greater than one minute; and outputting the minute-portion with a number of pulses corresponding to the determined number of fractional increments.

18. A non-transitory computer readable storage medium storing one or more programs, the one or more programs comprising instructions, which when executed by one or more processors of an electronic device with a touch-sensitive display screen and a tactile output generator, cause the device to:

detect a sequence of touch inputs that includes at least a first touch input and a second touch input on the touch-sensitive display screen;

in response to detecting the sequence of touch inputs on the touch-sensitive display screen:

in accordance with a determination that the sequence of touch inputs detected on the touch-sensitive display screen meets a tactile time output criteria and a current time of day is a first time, wherein the tactile time output criteria includes a criterion that is met when the first touch input and the second touch input are detected on the touch-sensitive display screen within a predetermined time threshold while the state of the touch-sensitive display screen is in an off state, output, by the tactile output generator, a first tactile output pattern that is indicative of the first time;

in accordance with a determination that the sequence of touch inputs detected on the touch-sensitive display screen meets the tactile time output criteria and the current time of day is a second time, output, by the tactile output generator, a second tactile output pattern that is indicative of the second time, wherein the first tactile output pattern and the second tactile output pattern are different; and in accordance with a determination that the sequence of touch inputs detected on the touch-sensitive display screen is detected while the state of the touch-sensitive display screen is in an on state:

forgo output of a tactile output pattern that is indicative of the current time of day; and perform a function at the electronic device other than outputting a tactile output pattern that is indicative of the current time of day.

19. The non-transitory computer readable storage medium of claim 18, wherein the tactile time output criteria includes a criterion that is met when an accessibility mode at the electronic device is enabled.

20. The non-transitory computer readable storage medium of claim 18, wherein the electronic device further includes a display screen and the sequence of touch inputs includes a first tap and a second tap, the one or more programs further including instructions that cause the device to:

in response to detecting the first tap, turn on the display screen.

21. The non-transitory computer readable storage medium of claim 18, the one or more programs further including instructions that cause the device to:

in accordance with a determination that the sequence of touch inputs detected on the touch-sensitive display screen does not meet the tactile time output criteria, perform a function at the electronic device other than outputting a tactile output pattern that is indicative of the current time of day.

22. The non-transitory computer readable storage medium of claim 18, wherein the sequence of touch inputs includes a tap, the one or more programs comprising further instructions that cause the device to:

in accordance with a determination that the sequence of touch inputs detected on the touch-sensitive display screen does not meet the tactile time output criteria, activate a function that corresponds to a location of the tap.

23. The non-transitory computer readable storage medium of claim 22, wherein activating the function includes launching an application associated with an affordance located on the touch-sensitive display screen at the location of the tap.

24. The non-transitory computer readable storage medium of claim 18, wherein the first tactile output pattern that is indicative of the first time provides an indication of the first time in a Morse code format.

25. The non-transitory computer readable storage medium of claim 18, wherein the first tactile output pattern includes a first portion and a second portion distinct from the first portion in at least one of an output duration or an output intensity.

26. The non-transitory computer readable storage medium of claim 18, wherein the first tactile output pattern includes an hour-portion determined based on an hour value of the first time and a minute-portion determined based on a minute value of the first time.

27. The non-transitory computer readable storage medium of claim 26, wherein the hour-portion and the minute-portion are separated by a predetermined period of time during which no tactile output is generated by the device.

28. The non-transitory computer readable storage medium of claim 26, wherein:

the hour-portion includes a tens place subportion and a ones place subportion;

each of the tens place subportion and the ones place subportion is determined based on a respective value of the hour value of the first time; the outputting of the hour-portion includes outputting:

the tens place subportion comprising a number of pulses corresponding to a value in a tens place of the hour value, and the ones place subportion comprising a number of pulses corresponding to a value in a ones place of the hour value; and the tens place subportion is output before the ones place subportion is output.

29. The non-transitory computer readable storage medium of claim 28, the one or more programs including further instructions that cause the device to:

output the tens place subportion with a primary vibration profile defining at least one of a long output duration or a strong output intensity per pulse; and output the ones place subportion with a secondary vibration profile defining at least one of a short output duration or a low output intensity per pulse.

30. The non-transitory computer readable storage medium of claim 28, wherein:

the hour-portion includes a major subportion and a minor subportion;

the major subportion is determined based on a number of major hour increments in the hour value and the minor subportion is determined based on a number of minor hour increments in the hour value remaining after the major hour increments are determined;

each major hour increment is greater than one hour and greater than each minor hour increment;

the outputting of the hour-portion includes outputting:
   the major subportion comprising a number of pulses corresponding to a number of major hour increments of the hour value, and
   the minor subportion comprising a number of pulses corresponding to a number of minor hour increments of the hour value after the major hour increments are determined; and
the major subportion is output before the minor subportion is output.

31. The non-transitory computer readable storage medium of claim 30, the one or more programs further including instructions that cause the device to:
   output the major subportion with a primary tactile output profile defining at least one of a first output duration or a first output intensity; and
   output the minor subportion with a secondary tactile output profile defining at least one of a second output duration that is different the first output duration or a second output intensity that is different from the first output intensity.

32. The non-transitory computer readable storage medium of claim 28, wherein:
   the minute-portion includes a tens place subportion and a ones place subportion;
   the tens place subportion and the ones place subportion are both determined based on a same respective value of the minute value of the first time;
   the outputting of the minute-portion includes outputting:
      the tens place subportion comprising a number of pulses corresponding to a value in a tens place of the minute value, and
      the ones place subportion comprising a number of pulses corresponding to a value in a ones place of the minute value; and
   the tens place subportion is output before the ones place subportion is output.

33. The non-transitory computer readable storage medium of claim 32, the one or more programs further including instructions that cause the device to:
   output the tens place subportion with a primary tactile output profile defining at least one of a first output duration or a first output intensity; and
   output the ones place subportion with a secondary tactile output profile defining at least one of a second output duration that is different from the first output duration or a second output intensity that is different from the first output intensity.

34. The non-transitory computer readable storage medium of claim 32, the one or more programs further including instructions that cause the device to:
   determine a number of fractional increments based on the minute value of the first time, wherein each fractional increment of an hour is greater than one minute; and
   output the minute-portion with a number of pulses corresponding to the determined number of fractional increments.

35. A method, comprising:
   at an electronic device having a touch-sensitive display screen and a tactile output generator:
      detecting a sequence of touch inputs that includes at least a first touch input and a second touch input on the touch-sensitive display screen;
      in response to detecting the sequence of touch inputs on the touch-sensitive display screen:
         in accordance with a determination that the sequence of touch inputs detected on the touch-sensitive display screen meets a tactile time output criteria and a current time of day is a first time, wherein the tactile time output criteria includes a criterion that is met when the first touch input and the second touch input are detected on the touch-sensitive display screen within a predetermined time threshold while the state of the touch-sensitive display screen is in an off state, outputting, by the tactile output generator, a first tactile output pattern that is indicative of the first time;
         in accordance with a determination that the sequence of touch inputs detected on the touch-sensitive display screen meets the tactile time output criteria and the current time of day is a second time, outputting, by the tactile output generator, a second tactile output pattern that is indicative of the second time, wherein the first tactile output pattern and the second tactile output pattern are different; and
         in accordance with a determination that the sequence of touch inputs detected on the touch-sensitive display screen is detected while the state of the touch-sensitive display screen is in an on state:
            forgoing output of a tactile output pattern that is indicative of the current time of day; and
            performing a function at the electronic device other than outputting a tactile output pattern that is indicative of the current time of day.

36. The method of claim 35, wherein the tactile time output criteria includes a criterion that is met when an accessibility mode at the electronic device is enabled.

37. The method of claim 35, wherein the electronic device further includes a display screen and the sequence of touch inputs includes a first tap and a second tap, the method further comprising:
   in response to detecting the first tap, turning on the display screen.

38. The method of claim 35, further comprising:
   in accordance with a determination that the sequence of touch inputs detected on the touch-sensitive display screen does not meet the tactile time output criteria, performing a function at the electronic device other than outputting a tactile output pattern that is indicative of the current time of day.

39. The method of claim 35, wherein the sequence of touch inputs includes a tap, the method further comprising:
   in accordance with a determination that the sequence of touch inputs detected on the touch-sensitive display screen does not meet the tactile time output criteria, activating a function that corresponds to a location of the tap.

40. The method of claim 39, wherein activating the function includes launching an application associated with an affordance located on the touch-sensitive display screen at the location of the tap.

41. The method of claim 35, wherein the first tactile output pattern that is indicative of the first time provides an indication of the first time in a Morse code format.

42. The method of claim 35, wherein the first tactile output pattern includes a first portion and a second portion distinct from the first portion in at least one of an output duration or an output intensity.

43. The method of claim 35, wherein the first tactile output pattern includes an hour-portion determined based on an hour value of the first time and a minute-portion determined based on a minute value of the first time.

44. The method of claim 43, wherein the hour-portion and the minute-portion are separated by a predetermined period of time during which no tactile output is generated by the device.

45. The method of claim 43, wherein:
the hour-portion includes a tens place subportion and a ones place subportion;
each of the tens place subportion and the ones place subportion is determined based on a respective value of the hour value of the first time; the outputting of the hour-portion includes outputting:
the tens place subportion comprising a number of pulses corresponding to a value in a tens place of the hour value, and
the ones place subportion comprising a number of pulses corresponding to a value in a ones place of the hour value; and
the tens place subportion is output before the ones place subportion is output.

46. The method of claim 45, further comprising:
outputting the tens place subportion with a primary vibration profile defining at least one of a long output duration or a strong output intensity per pulse; and
outputting the ones place subportion with a secondary vibration profile defining at least one of a short output duration or a low output intensity per pulse.

47. The method of claim 45, wherein:
the hour-portion includes a major subportion and a minor subportion;
the major subportion is determined based on a number of major hour increments in the hour value and the minor subportion is determined based on a number of minor hour increments in the hour value remaining after the major hour increments are determined;
each major hour increment is greater than one hour and greater than each minor hour increment;
the outputting of the hour-portion includes outputting:
the major subportion comprising a number of pulses corresponding to a number of major hour increments of the hour value, and
the minor subportion comprising a number of pulses corresponding to a number of minor hour increments of the hour value after the major hour increments are determined; and
the major subportion is output before the minor subportion is output.

48. The method of claim 47, further comprising:
outputting the major subportion with a primary tactile output profile defining at least one of a first output duration or a first output intensity; and
outputting the minor subportion with a secondary tactile output profile defining at least one of a second output duration that is different the first output duration or a second output intensity that is different from the first output intensity.

49. The method of claim 43, wherein:
the minute-portion includes a tens place subportion and a ones place subportion;
the tens place subportion and the ones place subportion are both determined based on a same respective value of the minute value of the first time;
the outputting of the minute-portion includes outputting:
the tens place subportion comprising a number of pulses corresponding to a value in a tens place of the minute value, and
the ones place subportion comprising a number of pulses corresponding to a value in a ones place of the minute value; and
the tens place subportion is output before the ones place subportion is output.

50. The method of claim 49, further comprising:
outputting the tens place subportion with a primary tactile output profile defining at least one of a first output duration or a first output intensity; and
outputting the ones place subportion with a secondary tactile output profile defining at least one of a second output duration that is different from the first output duration or a second output intensity that is different from the first output intensity.

51. The method of claim 49, further comprising:
determining a number of fractional increments based on the minute value of the first time, wherein each fractional increment of an hour is greater than one minute; and
outputting the minute-portion with a number of pulses corresponding to the determined number of fractional increments.

* * * * *